United States Patent [19]
Vassiliadis et al.

[11] Patent Number: 5,502,826
[45] Date of Patent: Mar. 26, 1996

[54] SYSTEM AND METHOD FOR OBTAINING PARALLEL EXISTING INSTRUCTIONS IN A PARTICULAR DATA PROCESSING CONFIGURATION BY COMPOUNDING INSTRUCTIONS

[75] Inventors: Stamatis Vassiliadis, Vestal; Bartholomew Blaner, Newark Valley, both of N.Y.

[73] Assignee: International Business Machines Corporation, Armonk, N.Y.

[21] Appl. No.: 186,221

[22] Filed: Jan. 25, 1994

Related U.S. Application Data

[63] Continuation of Ser. No. 13,982, Feb. 5, 1993, abandoned, which is a continuation of Ser. No. 519,384, May 4, 1990, abandoned.

[51] Int. Cl.⁶ .................................................. G06F 9/44
[52] U.S. Cl. ................ 395/375; 364/259.2; 364/DIG. 1; 395/800; 395/700; 395/500
[58] Field of Search .................................. 395/375, 700, 395/500, 800

[56] References Cited

U.S. PATENT DOCUMENTS

| | | | |
|---|---|---|---|
| 3,293,616 | 12/1966 | Mullery et al. | 395/375 |
| 3,343,135 | 9/1967 | Frieman et al. | 395/700 |
| 3,346,851 | 10/1967 | Thornton et al. | 364/704 |
| 3,611,306 | 10/1971 | Reigel | 395/65.0 |
| 4,295,193 | 10/1981 | Pomerene . | |
| 4,439,828 | 3/1984 | Martin | 364/200 |
| 4,574,348 | 3/1986 | Scallon . | |
| 4,594,655 | 6/1986 | Hao et al. . | |
| 4,780,820 | 10/1988 | Sowa . | |
| 4,807,115 | 2/1989 | Torug . | |
| 4,847,755 | 7/1989 | Morrison et al. . | |
| 4,858,105 | 8/1989 | Kuriyama et al. . | |
| 4,942,525 | 7/1990 | Shiatani et al. . | |
| 5,133,077 | 7/1992 | Karne et al. | 395/800 |

FOREIGN PATENT DOCUMENTS

| | | |
|---|---|---|
| 0052194 | 5/1982 | European Pat. Off. . |
| 0449661 | 10/1991 | European Pat. Off. . |
| 61-245239 | 10/1986 | Japan . |

OTHER PUBLICATIONS

Acosta, R. D., et al., "An Instruction Issuing Approach to Enhancing Performance in Multiple Functional Unit Processors", IEEE Transactions on Computers, Fall, C–35 No. 9, Sep. 1986, pp. 815–828.

Anderson, V. W., et al., the IBM System/360 Model 91: "Machine Philosophy and Instruction Handling", computer structures: Principles and Examples (Siewiorek, et al., ed (McGraw–Hill, 1982, pp. 276–292.

(List continued on next page.)

*Primary Examiner*—Ken S. Kim
*Attorney, Agent, or Firm*—Lynn L. Augspurger; Laurence J. Marhoefer

[57] ABSTRACT

Scalable compound instruction set machine and method which provides for processing a set of instructions or program to be executed by a computer to determine statically which instructions may be combined into compound instructions which are executed in parallel by a scalar machine. Such processing looks for classes of instructions that can be executed in parallel without data-dependent or hardware-dependent interlocks. Without regard to their original sequence the individual instructions are combined with one or more other individual instructions to form a compound instruction which eliminates interlocks. Control information is appended to identify information relevant to the execution of the compound instructions. The result is a stream of scalar instructions compounded or grouped together before instruction decode time so that they are already flagged and identified for selective simultaneous parallel execution by execution units. The compounding does not change the object code results and existing programs realize performance improvements while maintaining compatibility with previously implemented systems for which the original set of instructions was provided.

8 Claims, 18 Drawing Sheets

OTHER PUBLICATIONS

Capozzi, A. J., et al., "Non-Sequential High-Performance Processing" IBM Technical Disclosure Bulletin, vol. 27, No. 5, Oct. 1984, pp. 2842–2844.

Chan, S., et al., "Building Parallelism into the Instruction Pipeline", High Performance Systems, Dec., 1989, pp. 53–60.

Murakami, K., et al., "SIMP (Single Instruction Stream/ Multiple Instruction Pipelining); A Novel High–Speed Single Processor Architecture", Proceedings of the Sixteenth Annual Syposium on Computer Architecture, 1989, pp. 78–85.

Smith, J. E., "Dynamic Instructions Scheduling and the Astronautics ZS–1", IEEE Computer, Jul., 1989, pp. 21–35.

Smith, M. D., et al., "Limits on Multiple Instruction Issue", ASPLOS III, 1989, pp. 290–302.

Tomasulo, R. M., "An Efficient Algorithm for Exploiting Multiple Arithmetic Units", Computer Structures, Principles, and Examples (Siewiorek, et al. ed), McGraw–Hill, 1982, pp. 293–302.

Wulf, P. S., "The WM Computer Architecture", Computer Architecture News, vol. 16, No. 1, Mar. 1988, pp. 70–84.

Jouppi, N. P., et al., "Available Instruction–Level Parallelism for Superscalar Pipelined Machines", ASPLOS III, 1989, pp. 272–282.

Jouppi, n. P., "The Non–Uniform Distribution of Instruction–Level and Machine Parallelism and its Effect on Performance", IEEE Transactions on Computers, vol. 38, No. 12, Dec., 1989, pp. 1645–1658.

Ryan, D. E., "Entails 80960: An Architecture Optimized for Embedded Control", IEEE Microcomputers, vol. 8, No. 3, Jun., 1988, pp.63–76.

Colwell, R. P., et al., "A VLIW Architecture for a Trace Scheduling Complier", IEEE Transactions on Computers, vol. 37, No. 8, Aug., 1988, pp. 967–979.

Fisher, J. A., "The VLIW Machine: A Multi–Processor for Compiling Scientific Code", IEEE Computer, Jul., 1984, pp. 45–53.

Berenbaum, A. D., "Introduction to the CRISP Instruction Set Architecture", Proceedings of COMPCON, Spring, 1987, pp. 86–89.

Bandyopadhyay, S., et al., "Compiling for the CRISP Microprocessor", Proceedings of COMPCON, Spring, 1987, pp. 96–100.

Hennessy, J., et al., "MIPS: A VSI Processor Architecture", Proceedings of the CMU Conference on VLSI Systems and Computations, 1981, pp. 337–346.

Patterson, E. A., "Reduced Instruction Set Computers", Communicatioins of the ACM, vol. 28, No. 1, Jan., 1985, pp. 8–21.

Radin, G., "the 801 Mini–Computer", IBM Journal of Research and Development, vol. 27, No. 3, May, 1983, pp. 237–246.

Ditzel, D. R., et al., "Branch Folding in the CRISP Microprocessor".

"Reducing Branch Delay to Zero", Proceedings of COMPCON, Spring 1987, pp. 2–9.

Hwu, W. W., et al., "Checkpoint Repair for High–Performance Out–of–Order Execution Machines", IEEE Transactions on Computers vol. C36, No. 12, Dec., 1987, pp. 1496–1594.

Lee, J. K. F., et al., "Branch Prediction Strategies in Branch Target Buffer Design", IEEE Computers, vol. 17, No. 1, Jan. 1984, pp. 6–22.

Riseman, E. M., "The Inhibition of Potential Parallelism by Conditional Jumps", IEEE Transactions on Computers, Dec., 1972, pp. 1405–1411.

Smith, J. E., "A Study of Branch Prediction Strategies", IEEE Proceedings of the Eight Annual Symposium on Computer Architecture, May 1981, pp. 135–148.

Archibold, James, et al., Cache Coherence Protocols: "Evaluation Using a Multiprocessor Simulation Model", ACM Transactions on Computer Systems , vol. 4, Nov. 1986, pp. 273–398.

Baer, J. L., et al. "Multi–Level Cache Hierarchies: Organizations, Protocols, and Performance" Journal of Parallel and Distributed Computing vol. 6, 1989, pp. 451–476.

Smith, A. J., "Cache Memories", Computing Surveys, vol. 14, No. 3 Sep., 1982, pp. 473–530.

Smith, J. E., et al., "A Study of Instructions Cache Organizations and Replacement Policies", IEEE Proceedings of the Tenth Annual International Symposium on Computer Architecture, Jun., 1983, pp. 132–137.

Vassiliadis, S., et al., "Condition Code Predictory for Fixed–Arithmetic Units", International Journal of Electronics, vol. 66, No. 6, 1989, pp. 887–890.

Tucker, S. G., "The IBM 3090 System: An Overview", IBM Systems Journal, vol. 25, No. 1, 1986, pp.4–19.

IBM Publication No. SA22–7200–0, Principles of Operation, IBM Enterprise Systems Architecture/370, 1988.

The Architecture of Pipelined Computers, by Peter M. Kogge Hemisphere Publishing Corporation, 1981.

R. J. Eberhard, IBM Technical Disclosure Bulletin, "Early Release of a Processor Following Address Translation Prior to Page Access Checking", vol. 33, No. 10A, Mar. 1991.

Higbee, "Overlapped Operation with Microprogramming", *IEEE Transactions on Computers,* vol. C–27, No. 3, pp. 270–275.

Wang, "Distributed Instruction Set Computer", *Proceedings of the International Conference on Parallel Processing,* Aug. 1988, vol. 1, pp. 426–429.

| CATEGORY NUMBER | CATEGORY NAME |
|---|---|
| 1. | RR-FORMAT LOADS, LOGICALS, ARITHMETICS, COMPARES<br><br>• LCR – LOAD COMPLEMENT<br>• LPR – LOAD POSITIVE<br>• LNR – LOAD NEGATIVE<br>• LR – LOAD REGISTER<br>• LTR – LOAD AND TEST<br>• NR – AND<br>• OR – OR<br>• XR – EXCLUSIVE OR<br>• AR – ADD<br>• SR – SUBTRACT<br>• ALR – ADD LOGICAL<br>• SLR – SUBTRACT LOGICAL<br>• CLR – COMPARE LOGICAL<br>• CR – COMPARE |
| 2. | RS-FORMAT SHIFTS (NO STORAGE ACCESS)<br><br>• SRL – SHIFT RIGHT LOGICAL<br>• SLL – SHIFT LEFT LOGICAL<br>• SRA – SHIFT RIGHT ARITHMETIC<br>• SLA – SHIFT LEFT ARITHMETIC<br>• SRDL – SHIFT RIGHT LOGICAL<br>• SLDL – SHIFT LEFT LOGICAL<br>• SRDA – SHIFT RIGHT ARITHMETIC<br>• SLDA – SHIFT LEFT ARITHMETIC |
| 3. | BRANCHES–ON COUNT AND INDEX<br><br>• BCT – BRANCH ON COUNT (RX-FORMAT)<br>• BCTR – BRANCH ON COUNT (RR-FORMAT)<br>• BXH – BRANCH ON INDEX HIGH (RS-FORMAT)<br>• BXLE – BRANCH ON INDEX LOW (RS-FORMAT) |
| 4. | BRANCHES–ON CONDITION<br><br>• BC – BRANCH ON CONDITION (RX-FORMAT)<br>• BCR – BRANCH ON CONDITION (RR-FORMAT) |

| FIG. 4A |
|---|
| FIG. 4B |

| CATEGORY NUMBER | CATEGORY NAME |
|---|---|
| 5. | BRANCHES-AND LINK<br><br>• BAL - BRANCH AND LINK (RX-FORMAT)<br>• BALR - BRANCH AND LINK (RR-FORMAT)<br>• BAS - BRANCH AND SAVE (RX-FORMAT)<br>• BASR - BRANCH AND SAVE (RR-FORMAT) |
| 6. | STORES<br><br>• STCM - STORE CHARACTERS UNDER MASK<br>•    (0-4-BYTE STORE, RS-FORMAT)<br>• MVI - MOVE IMMEDIATE (ONE BYTE, SI-FORMAT)<br>• ST - STORE (4 BYTES)<br>• STC - STORE CHARACTER (ONE BYTE)<br>• STH - STORE HALF (2 BYTES) |
| 7. | LOADS<br><br>• LH - LOAD HALF (2 BYTES)<br>• L - LOAD (4 BYTES) |
| 8. | LA-LOAD ADDRESS |
| 9. | RX/SI/RS-FORMAT ARITHMETICS, LOGICALS, INSERTS, COMPARES<br><br>• A - ADD<br>• AH - ADD HALF<br>• AL - ADD LOGICAL<br>• N - AND<br>• O - OR<br>• S - SUBTRACT<br>• SH - SUBTRACT HALF<br>• SL - SUBTRACT LOGICAL<br>• X - EXCLUSIVE OR<br>• IC - INSERT CHARACTER<br>• ICM - INSERT CHARACTERS UNDER MASK (0-TO 4-BYTE FETCH)<br>• C - COMPARE<br>• CH - COMPARE HALF<br>• CL - COMPARE LOGICAL<br>• CLI - COMPARE LOGICAL IMMEDIATE<br>• CLM - COMPARE LOGICAL CHARACTER UNDER MASK |
| 10. | TM-TEST UNDER MASK |

FIG.4B

```
BYTE              0  2  4  6  8  10 12 14 16 18 20 22 24
                                TEXT
      SEQUENCE   | 6   | 2| 2| 4  | 2|  6  | 2| 2 |
  70
      C-VECTOR   |0|0|0|1|0|1|0|0|0|0|1|0|
  72

BYTE       =  TEXT ENUMERATION
SEQUENCE   =  PROGRAM INSTRUCTION LENGTH SEQUENCE
C-VECTOR   =  COMPOUNDING BITS FOR EVERY TWO BYTES
```

| $t_0$ $t_1$ $t_2$ $t_3$ $t_4$ $t_5$ $t_6$ $t_7$ |

| BIT | FUNCTION |
|---|---|
| $t_0$ | IF 1, THIS INSTRUCTION MARKS THE BEGINNING OF A COMPOUND INSTRUCTION. |
| $t_1$ | IF 1, THEN EXECUTE TWO COMPOUND INSTRUCTIONS IN PARALLEL. |
| $t_2$ | IF 1, THEN THIS COMPOUND INSTRUCTION HAS MORE THAN ONE EXECUTION CYCLE. |
| $t_3$ | IF 1, THEN SUSPEND PIPELINING. |
| $t_4$ | IF INSTRUCTION IS A BRANCH, THEN IF THIS BIT IS 1, THE BRANCH IS PREDICTED TO BE TAKEN. |
| $t_5$ | IF 1, THEN THIS INSTRUCTION HAS A STORAGE INTERLOCK FROM A PREVIOUS COMPOUND INSTRUCTION. |
| $t_6$ | IF 1, THEN ENABLE DYNAMIC INSTRUCTION ISSUE. |
| $t_7$ | IF 1, THEN THIS INSTRUCTION USES AN ALU. |

FIG.12

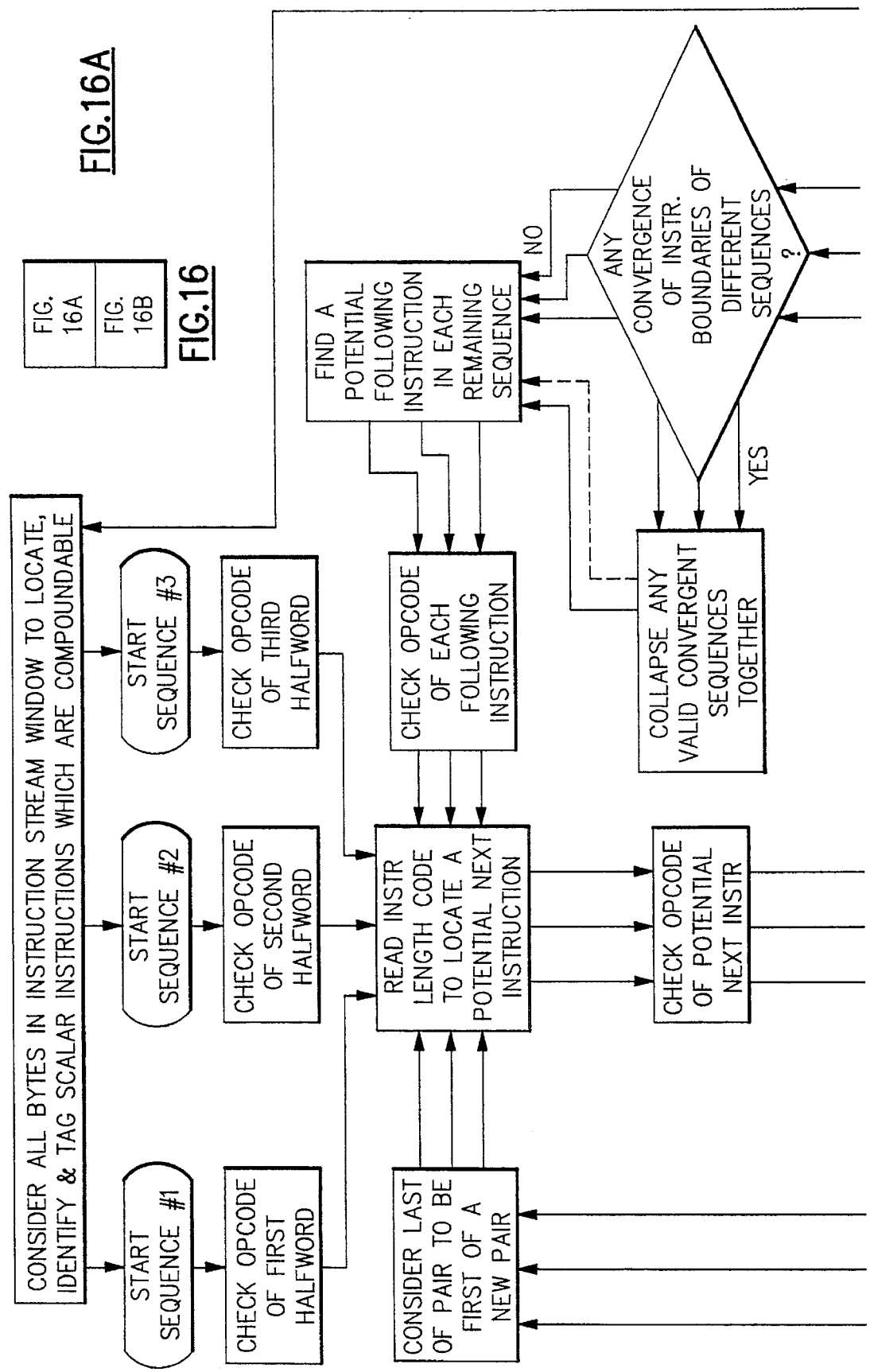

FIG.17

| CATE-GORY | 1 | 2 | 3 | 4 | 5 | 6 | 7 | 8 | 9 | 10 |
|---|---|---|---|---|---|---|---|---|---|---|
| 1 | A | S | A | A | A | S | A | A | A | A |
| 2 | S | N | S | S | S | N | S | S | S | S |
| 3 | A | A | N | A | A | A | A | A | A | A |
| 4 | A | A | A | A | A | A | N | A | A | A |
| 5 | A | A | A | A | A | N | N | A | N | A |
| 6 | A | S | S | S | S | S | S | S | S | N |
| 7 | S | A | S | S | S | S | S | S | N | N |
| 8 | A | S | S | S | S | S | S | A | S | A |
| 9 | A | A | A | A | A | A | A | A | N | N |
| 10 | A | A | A | A | A | A | A | A | N | N |

KEY:
A  ALWAYS COMPOUND
S  SOMETIMES COMPOUND
N  NEVER COMPOUND

SYSTEM AND METHOD FOR OBTAINING PARALLEL EXISTING INSTRUCTIONS IN A PARTICULAR DATA PROCESSING CONFIGURATION BY COMPOUNDING INSTRUCTIONS

CROSS-REFERENCE TO RELATED APPLICATIONS

This application is a continuation of application Ser. No. 08/013,982 filed Feb. 5, 1993, now abandoned, which is a continuation of application Ser No. 07/519,384, filed on May 4, 1990, now abandoned.

RELATED APPLICATIONS

The following related applications are commonly owned by the same assignee and are incorporated by reference herein: "Data Dependency Collapsing Hardware Apparatus" filed Apr. 4, 1990, Ser. No. 07/504,910, now U.S. Pat. No. 5,051,940, issued Sep. 24, 1991 and "General Purpose Compounding Technique For Instruction-Level Parallel Processors" filed May 4th, 1990, Ser. No. 07/519,382, now abandoned.

FIELD OF THE INVENTION

This invention relates generally to parallel processing by computer, and more particularly relates to processing an instruction stream to identify those instructions which can be issued and executed in parallel in a specific computer system configuration.

BACKGROUND OF THE INVENTION

The concept of parallel execution of instructions has helped to increase the performance of computer systems. Parallel execution is based on having separate functional units which can execute two or more of the same or different instructions simultaneously.

Another technique used to increase the performance of computer systems is pipelining. In general, pipelining is achieved by partitioning a function to be performed by a computer into independent subfunctions and allocating a separate piece of hardware, or stage, to perform each subfunction. Each stage is defined to occupy one basic machine cycle in time. Pipelining does provide a form of parallel processing since it is possible to execute multiple instructions concurrently. Ideally, one new instruction can be fed into the pipeline per cycle, with each instruction in the pipeline being in a different stage of execution. The operation is analogous to a manufacturing assembly line, with a number of instances of the manufactured product in varying stages of completion.

However, many times the benefits of parallel execution and/or pipelining are not achieved because of delays like those caused by data dependent interlocks and hardware dependent interlocks. An example of a data dependent interlock is a so-called write-read interlock where a first instruction must write its result before the second instruction can read and subsequently use it. An example of hardware dependent interlock is where a first instruction must use a particular hardware component and a second instruction must also use the same particular hardware component.

One of the techniques previously employed to avoid interlocks (sometimes called pipeline hazards) is called dynamic scheduling. Dynamic scheduling is based on the fact that with the inclusion of specialized hardware, it is possible to reorder instruction sequences after they have been issued into the pipeline for execution.

There have also been some attempts to improve performance through so-called static scheduling which is done before the instruction stream is fetched from storage for execution. Static scheduling is achieved by moving code and thereby reordering the instruction sequence before execution. This reordering produces an equivalent instruction stream that will more fully utilize the hardware through parallel processing. Such static scheduling is typically done at compile time. However, the reordered instructions remain in their original form and conventional parallel processing still requires some form of dynamic determination just prior to execution of the instructions in order to decide whether to execute the next two instructions serially or in parallel.

Such scheduling techniques can improve the overall performance of a pipelined computer, but cannot alone satisfy the ever present demands for increased performance. In that regard, many of the recent proposals for general purpose computing are related to the exploitation of parallelism at the instruction level beyond that attained by pipelining. For example, further instruction level parallelism has been achieved explicitly by issuing multiple instructions per cycle with so-called superscalar machines, rather than implicitly as with dynamic scheduling of single instructions or with vector machines. The name superscalar for machines that issue multiple instructions per cycle is to differentiate them from scalar machines that issue one instruction per cycle.

In a typical superscalar machine, the opcodes in a fetched instruction stream are decoded and analyzed dynamically by instruction issue logic in order to determine whether the instructions can be executed in parallel. The criteria for such last-minute dynamic scheduling are unique to each instruction set architecture, as well for the underlying implementation of that architecture in any given instruction processing unit. Its effectiveness is therefore limited by the complexity of the logic to determine which combinations of instructions can be executed in parallel, and the cycle time of the instruction processing unit is likely to be increased. The increased hardware and cycle time for such superscalar machines become even a bigger problem in architectures which have hundreds of different instructions.

There are other deficiencies with dynamic scheduling, static scheduling, or combinations thereof. For example, it is necessary to review each scalar instruction anew every time it is fetched for execution to determine its capability for parallel execution. There has been no way provided to identify and flag ahead of time those scalar instructions which have parallel execution capabilities.

Another deficiency with dynamic scheduling of the type implemented in super scalar machines is the manner in which scalar instructions are checked for possible parallel processing. Superscalar machines check scalar instructions based on their opcode descriptions, and no way is provided to take into account hardware utilization. Also, instructions are issued in FIFO fashion thereby eliminating the possibility of selective grouping to avoid or minimize the occurrence of interlocks.

There are some existing techniques which do seek to consider the hardware requirements for parallel instruction processing. One such system is a form of static scheduling called the Very Long Instruction Word machine in which a sophisticated compiler rearranges instructions so that hardware instruction scheduling is simplified. In this approach the compiler must be more complex than standard compilers so that a bigger window can be used for purposes of finding more parallelism in an instruction stream. But the resulting instructions may not necessarily be object code compatible with the pre-existing architecture, thereby solving one problem while creating additional new problems. Also, substantial additional problems arise due to frequent branching which limits its parallelism.

Therefore, none of these prior art approaches to parallel processing have been sufficiently comprehensive to minimize all possible interlocks, while at the same time avoiding major redesign of the architected instruction set and avoiding complex logic circuits for dynamic decoding of fetched instructions.

Accordingly, what is needed is an improvement in digital data processing which facilitates the execution of existing machine instructions in parallel in order to increase processor performance. Since the number of instructions executed per second is a product of the basic cycle time of the processor and the average number of cycles required per instruction completion, what is needed is a solution which takes both of these parameters under consideration. More specifically, a mechanism is needed that reduces the number of cycles required for the execution of an instruction for a given architecture. In addition, an improvement is needed which reduces the complexity of the hardware necessary to support parallel instruction execution, thus minimizing any possible increase in cycle time. Additionally, it would be highly desirable for the proposed improvement to provide compatibility of the implementation with an already defined system architecture while introducing parallelism at the instruction level of both new and existing machine code.

BRIEF SUMMARY AND OBJECTS OF THE INVENTION

In view of the foregoing, it is an object of the present invention to provide a method for statically analyzing, at a time prior to instruction decode and execution, a sequence of existing instructions to generate compound instructions formed by adjacent grouping of existing instructions capable of parallel execution. A related object is to add relevant control information to the instruction stream including grouping information indicating where a compound instruction starts as well as indicating the number of existing instructions which are incorporated into each compound instruction.

Yet another object is to analyze a large window of an instruction byte stream prior to instruction fetch, with the window being adjustable to different positions in the instruction byte stream in order to achieve optimum selective grouping of individual adjacent instructions which form a compound instruction.

A further object is to provide an instruction compounding method with the aforementioned characteristics which is applicable to complex instruction architectures having variable length instructions and having data intermixed with instructions, and which is also applicable to RISC architectures wherein instructions are usually a constant length and wherein data is not mixed with instructions.

An additional object is to provide a method of pre-processing an instruction stream to create compound instructions, wherein the method can be implemented by software and/or hardware at various points in the computer system prior to instruction decoding and execution. A related object is to provide a method of pre-processing existing instructions which operates on a binary instruction stream as part of a post-compiler, or as part of an in-memory compounder, or as part of cache instruction compounding unit, and which can start compounding instructions at the beginning of a byte stream without knowing the boundaries of the instructions.

Thus, the invention contemplates a method of pre-processing an instruction stream to create compound instructions composed of scalar instructions which have still retained their original contents. Compound instructions are created without changing the object code of the scalar instructions which form the compound instruction, thereby allowing existing programs to realize a performance improvement on a compound instruction machine while maintaining compatibility with previously implemented scalar instruction machines.

More specifically, the invention provides a set of compounding rules based on an analysis of existing instructions to separate them into different classes. The analysis determines which instructions qualify, either with instructions in their own class or with instructions in other classes, for parallel execution in a particular hardware configuration. Such compounding rules are used as a standard for pre-processing an instruction stream in order to look for groups of two or more adjacent scalar instructions that can be executed in parallel. In some instances certain types of interlocked instructions can be compounded for parallel execution where the interlocks are collapsible in a particular hardware configuration. In other configurations where the interlocks are non-collapsible, the instructions having data dependent or hardware dependent interlocks are excluded from groups forming compound instructions.

Each compound instruction is identified by control information such as tags associated with the compound instruction, and the length of a compound instruction is scalable over a range beginning with a set of two scalar instructions up to whatever maximum number that can be executed in parallel by the specific hardware implementation. Since the compounding rules are based on an identification of classes of instructions rather than on individual instruction, complex matrices showing all possible combinations of specific individual instructions are no longer needed. While keeping their original sequence intact, individual instructions are selectively grouped and combined with one or more other adjacent scalar instructions to form a compound instruction which contains scalar instructions which still have object code compatibility with non-compound scalar instructions. Control information is appended to identify information relevant to the execution of the compound instructions.

These and other objects, features and advantages of the invention will be apparent to those skilled in the art in view of the following detailed description and accompanying drawings.

BRIEF DESCRIPTION OF THE DRAWINGS

FIG. 4 comprises FIGS. 4A and 4B which together illustrates an example of a possible selective categorization of a portion of the instructions executed by an existing scalar machine;

FIG. 12 shows an exemplary compound instruction control field;

FIG. 17 is a chart showing typical compoundable pairs of instruction categories for the portion of the System/370 instruction set shown in FIG. 4.

DETAILED DESCRIPTION OF PREFERRED EMBODIMENTS

The essence of the present invention is the pre-processing of a set of instructions or program to be executed by a computer, to determine statically which non-interlocked instructions may be combined into compound instructions, and the appending of control information to identify such compound instructions. Such determination is based on compounding rules which are developed for an instruction set of a particular architecture. Existing scalar instructions are categorized based on an analysis of their operands, hardware utilization and function, so that grouping of instructions by compounding to avoid non-collapsible interlocks is based on instruction category comparison rather than specific instruction comparison.

As shown in the various drawings and described in more detail hereinafter, this invention called a Scalable Compound Instruction Set Machine (SCISM) provides for a stream of scalar instructions to be compounded or grouped together before instruction decode time so that they are already flagged and identified for selective simultaneous parallel execution by appropriate instruction execution units. Since such compounding does not change the object code, existing programs can realize a performance improvement while maintaining compatibility with previously implemented systems.

Figure 1:
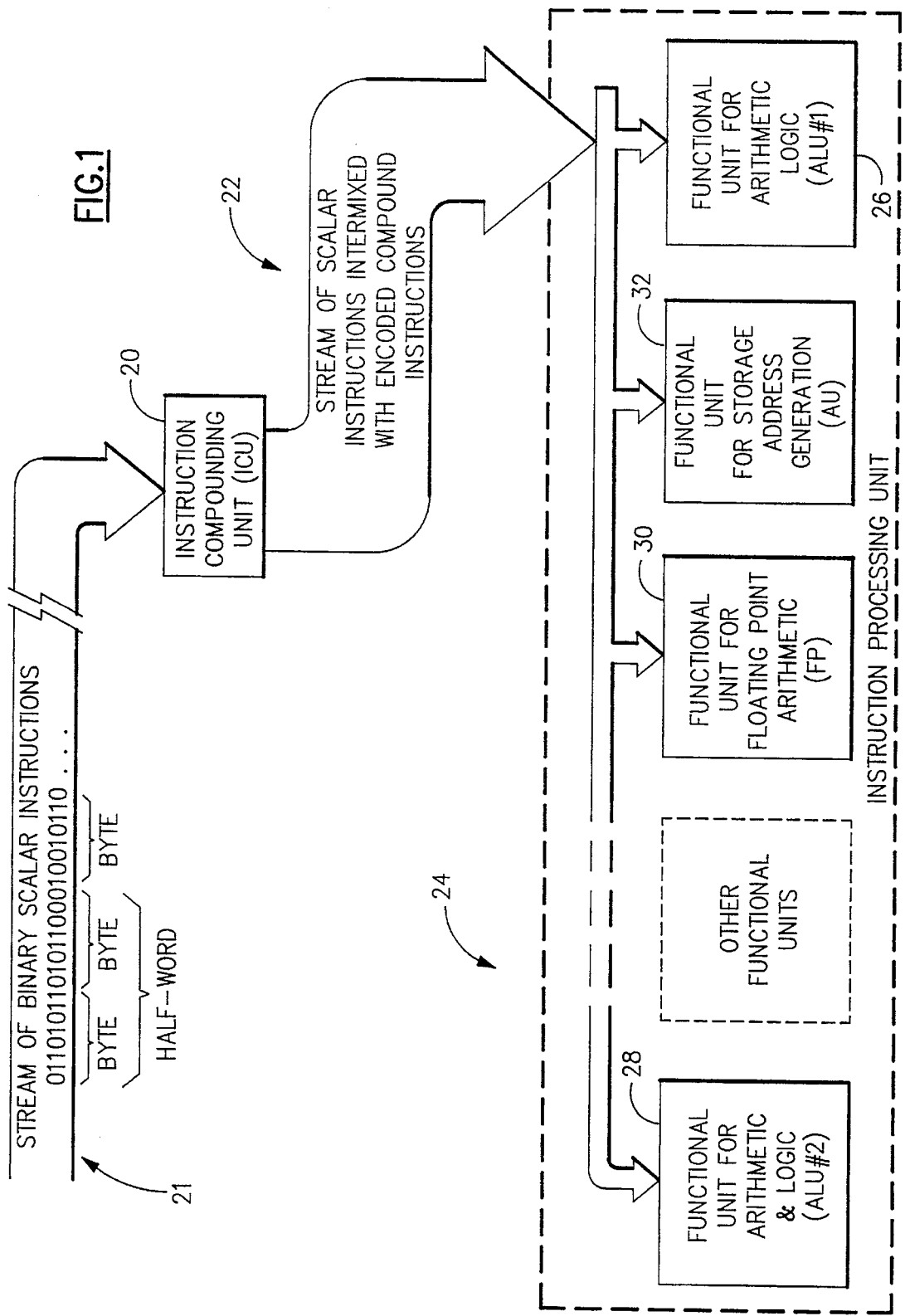
FIG. 1 is a high level schematic diagram of the invention.

As generally shown in FIG. 1, an instruction compounding unit 20 takes a stream of binary scalar instructions 21 (with or without data included therein) and selectively groups some of the adjacent scalar instructions to form encoded compound instructions. A resulting compounded instruction stream 22 therefore combines scalar instructions not capable of parallel execution and compound instructions formed by groups of scalar instructions which are capable of parallel execution. When a scalar instruction is presented to an instruction processing unit 24, it is routed to the appropriate functional unit for serial execution. When a compound instruction is presented to the instruction processing unit 24, its scalar components are each routed to their appropriate functional unit or interlock collapsing unit for simultaneous parallel execution. Typical functional units include but are not limited to an arithmetic and logic unit (ALU) 26, 28, a floating point arithmetic unit (FP) 30, and a store address generation unit (AU) 32. An exemplary data dependency collapsing unit is disclosed in co-pending application Ser. No. 07/504,910, entitled "Data Dependency Collapsing Hardware Apparatus" filed Apr. 4, 1990, now issued U.S. Pat. No. 5,051,940.

It is to be understood that the technique of the invention is intended to facilitate the parallel issue and execution of instructions in all computer architectures that process multiple instructions per cycle (although certain instructions may require more than one cycle to be executed)

Figure 2:
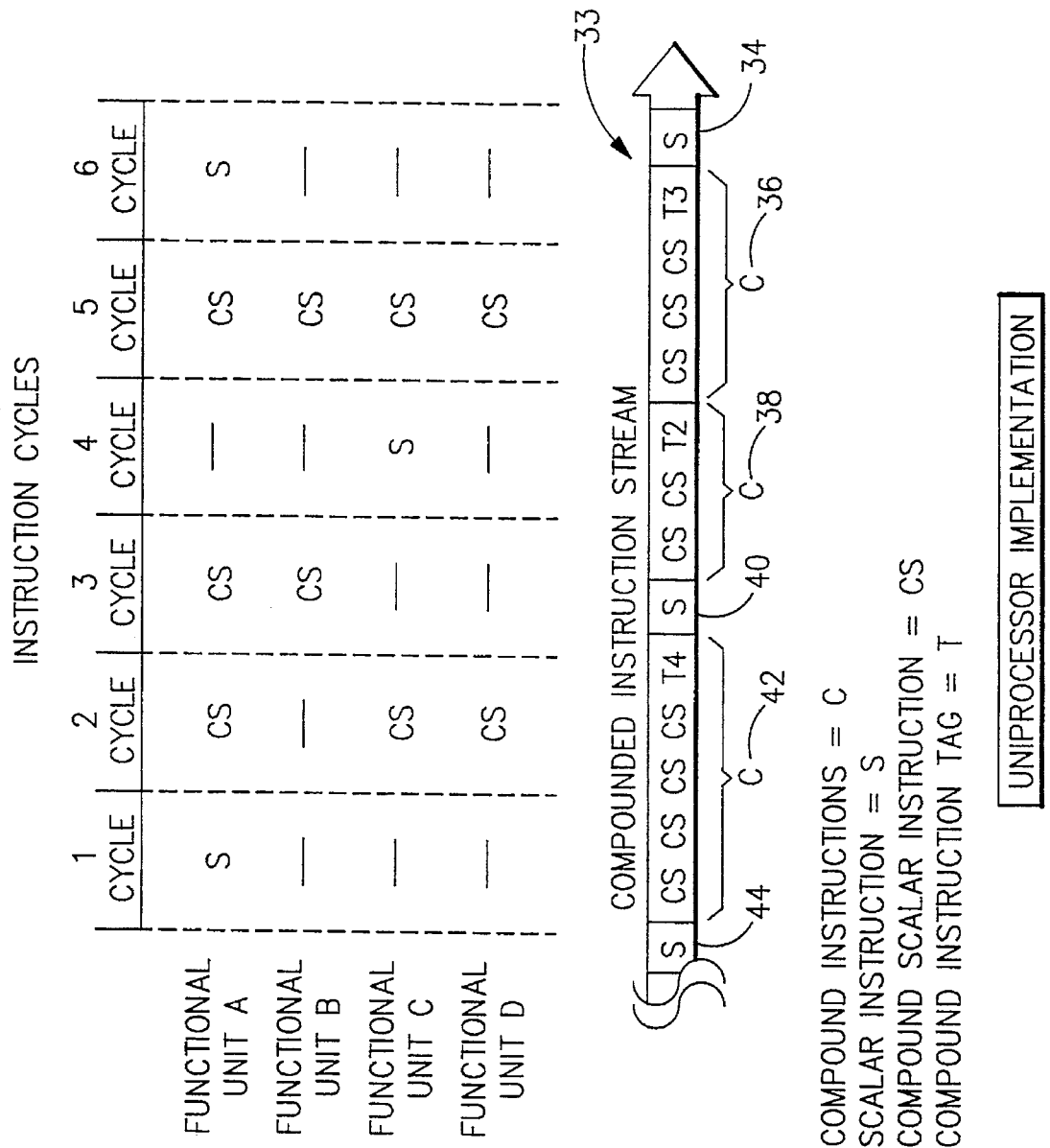
FIG. 2 is a timing diagram for a uniprocessor implementation showing the parallel execution of certain non-interlocked instructions which have been selectively grouped in a compound instruction stream.

As shown in FIG. 2, the invention can be implemented in a uniprocessor environment where each functional execution unit executes a scalar instruction (S) or alternatively a compounded scalar instruction (CS). As shown in the drawing, an instruction stream 33 containing a sequence of scalar and compounded scalar instructions has control tags (T) associated with each compound instruction. Thus, a first scalar instruction 34 could be executed singly by functional unit A in cycle 1; a triplet compound instruction 36 identified by tag T3 could have its three compounded scalar instructions executed in parallel by functional units A, C and D in cycle 2; another compound instruction 38 identified by tag T2 could have its pair of compounded scalar instructions executed in parallel by functional units A and B in cycle 3; a second scalar instruction 40 could be executed singly by functional unit C in cycle 4; a large group compound instruction 42 could have its four compounded scalar instructions executed in parallel by functional units A–D in cycle 5; and a third scalar instruction 44 could be executed singly by functional unit A in cycle 6.

Figure 3:
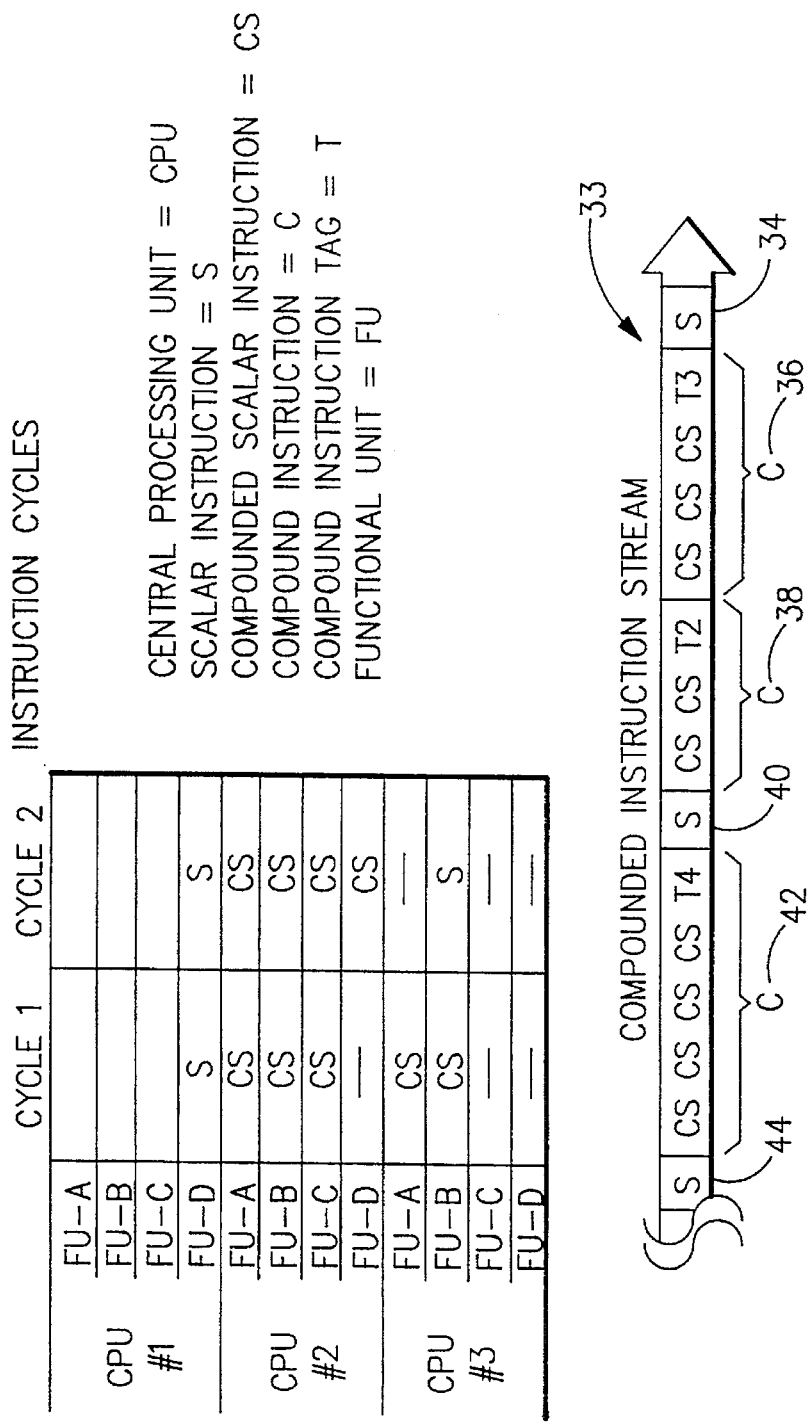
FIG. 3 is a timing diagram for a multiprocessor implementation showing the parallel execution of scalar and compound instructions which are not interlocked.

It is important to realize that multiple compound instructions are capable of parallel execution in certain computer system configurations. For example, the invention could be potentially implemented in a multiprocessor environment as shown in FIG. 3 where a compound instruction is treated as a unit for parallel processing by one of the CPUs (central processing units). As shown in the drawing, the same instruction stream 33 could be processed in only two cycles as follows. In a first cycle, a CPU #1 executes the first scalar instruction 34; the functional units of a CPU #2 execute triplet compound instruction 36; and the functional units of a CPU #3 execute the two compounded scalar instructions in compound instruction 38. In a second cycle, the CPU #1 executes the second scalar instruction 40; the functional units of CPU #2 execute the four compounded scalar instructions in compound instruction 42; and a functional unit of CPU #3 executes the third scalar instruction 44.

One example of a computer architecture which can be adapted for handling compound instructions is an IBM System/370 instruction level architecture in which multiple scalar instructions can be issued for execution in each machine cycle. In this context a machine cycle refers to all the pipeline steps or stages required to execute a scalar instruction. A scalar instruction operates on operands representing single-valued parameters. When an instruction stream is compounded, adjacent scalar instructions are selectively grouped for the purpose of concurrent or parallel execution.

The instruction sets for various IBM System/370 architectures such as System/370, the System/370 extended architecture (370-XA), and the System/370 Enterprise Systems Architecture (370-ESA) are well known. In that regard, reference is given here to the Principles of Operation of the IBM System/370 (publication #GA22-7000-10 1987), and to the Principles of Operation, IBM Enterprise Systems Architecture/370 (publication #SA22-7200-0 1988).

In general, an instruction compounding facility will look for classes of instruction that may be executed in parallel, and ensure that no interlocks between members of a compound instruction exist that cannot be handled by the hardware. When compatible sequences of instructions are found, a compound instruction is created.

More specifically, the System/370 instruction set can be broken into categories of instructions that may be executed in parallel in a particular computer system configuration. Instructions with certain of these categories may be combined or compounded with instructions in the same category or with instructions in certain other categories to form a compound instruction. For example, a portion of the System/370 instruction set can be partitioned into the categories illustrated in FIG. 4. The rationale for this categorization is based on the functional requirements of the System/370 instructions and their hardware utilization in a typical computer system configuration. The rest of the System/370 instructions are not considered specifically for compounding in this exemplary embodiment. This does not preclude them from being compounded by the methods and technique of the present invention disclosed herein. It is noted that the hardware structures required for compound instruction execution can be readily controlled by horizontal microcode, allowing for exploitation of parallelism in the remaining instructions not considered for compounding and not included in the categories of FIG. 4, thereby increasing performance.

One of the most common sequences in System/370 programs is to execute an instruction of the TM or RX-format COMPARES (C, CH, CL, CLI, CLM), the result of which is used to control the execution of a BRANCH-on-condition type instruction (BC, BCR) which immediately follows. Performance can be improved by executing the COMPARE and the BRANCH instructions in parallel, and this has sometimes been done dynamically in high performance instruction processors. Some difficulty lies in quickly identifying all the various members of the COMPARE class of instructions and all the members of the BRANCH class of instructions in a typical architecture during the instruction decoding process. This is one reason why the superscalar machines usually consider only a small number of specific scalar instructions for possible parallel processing. In contrast, such limited dynamic scheduling based only on a last-minute comparison of two specific instructions is avoided by the invention, because the analysis of all the members of the classes are accomplished ahead of time in order to develop adequate compounding rules for creating a compound instruction which is sure to work.

The enormous problem that arises from dynamic scheduling of individual instructions after fetch is shown by realizing that two-way compounding of the fifty seven individual instructions in FIG. 4 produces a 57×57 matrix of more than three thousand possible combinations. This is in sharp contrast to the 10×10 matrix of FIG. 17 for the same number of instructions considered from the point of view of possible category combinations, as provided by the present invention.

Many classes of instructions may be executed in parallel, depending on how the hardware is designed. In addition to the COMPARE and BRANCH compoundable pairs described above, many other compoundable combinations capable of parallel execution are possible (See FIG. 17), such as LOADS (category 7) compounded with RR-format instructions (category 1), BRANCHS (categories 3–5) compounded with LOAD ADDRESS (category 8), and the like.

In some instances the sequence order will affect the parallel execution capabilities and therefore determine whether two adjacent instructions can be compounded. In that regard, the row headings 45 identify the category of the first instruction in a byte stream and the column headings 47 identify the category of the next instruction which follows the first instruction. For example, BRANCHES (categories 3–5) followed by certain SHIFTS (category 2) are always compoundable 49, while SHIFTS (category 2) followed by BRANCHES (categories 3–5) are only "sometimes" compoundable 51.

The "sometimes" status identified as "S" in the chart of FIG. 17 can often be changed to "always" identified as "A" in the chart by adding additional functional hardware units to the computer system configuration. For example, consider a configuration which supports two-way compounding and which has no add-shift collapsing unit, but instead has a conventional ALU and a separate shifter. In other words, there is no interlock collapsing hardware for handling interlocked ADD and SHIFT instructions. Consider the following instruction sequence:

AR R1,R2

SRL R3 by D2

It is clear that this pair of instructions is compoundable for parallel execution. But in some instances it would not be compoundable due to a non-collapsible interlock, as shown in the following instruction sequence:

AR R1,R2

SRL R1 by D2

So the chart shows that a category 1 instruction (AR) followed by a category 2 instruction (SRL) is sometimes compoundable 53. By including an ALU which collapses certain interlocks such as the add/shift interlock shown above, the S could become an A in the chart of FIG. 17. Accordingly, the compounding rules must be updated to reflect any changes which are made in the particular computer system configuration.

As an additional example, consider the instructions contained in category 1 compounded with instructions from that same category in the following instruction sequence:

AR R1,R2

SR R3,R4

This sequence is free of data hazard interlocks and produces the following results which comprise two independent System/370 instructions:

R1=R1+R2

R3=R3−R4

Executing such a sequence would require two independent and parallel two-to-one ALU's designed to the instruction level architecture. Thus, it will be understood that these two instructions can be grouped to form a compound instruction in a computer system configuration which has two such ALU's. This example of compounding scalar instructions can be generalized to all instruction sequence pairs that are free of data dependent interlocks and also of hardware dependent interlocks.

In any actual instruction processor, there will be an upper limit to the number of individual instructions that can comprise a compound instruction. This upper limit must be specifically incorporated into the hardware and/or software unit which is creating the compound instructions, so that compound instructions will not contain more individual instructions (e.g., pair group, triplet group, group of four) than the maximum capability of the underlying execution hardware. This upper limit is strictly a consequence of the hardware implementation in a particular computer system configuration—it does not restrict either the total number of instructions that may be considered as candidates for compounding or the length of the group window in a given code sequence that may be analyzed for compounding.

In general, the greater the length of a group window being analyzed for compounding, the greater the parallelism that can be achieved due to more advantageous compounding combinations. In this regard, consider the sequence of instructions in the following Table 1:

TABLE 1

| X1 | | ;any compoundable instruction |
| X2 | | ;any compoundable instruction |
| LOAD | R1,(X) | ;load R1 from memory location X |
| ADD | R3,R1 | ;R3 = R3 + R1 |
| SUB | R1,R2 | ;R1 = R1 − R2 |
| COMP | R1,R3 | ;compare R1 with R3 |
| X3 | | ;any compoundable instruction |
| X4 | | ;any compoundable instruction |

If the hardware imposed upper limit on compounding is two (at most, two instructions can be executed in parallel in the same cycle), then there are a number of ways to compound this sequence of instructions depending on the scope of the compounding software.

If the scope of compounding were equal to four, then the compounding software would consider together (X1, X2, LOAD, ADD) and then slide forward one instruction at a time to consider together (X2, LOAD, ADD, SUB) and (LOAD, ADD, SUB, COMP) and (ADD, SUB, COMP, X3) and (SUB, COMP, X3, X4), thereby producing the following optimum pairings as candidates for a compound instruction:

[—X1][X2 LOAD][ADD SUB][COMP X3][X4 —]

This optimum pairing provided by the invention completely relieves the interlocks between the LOAD and ADD and between the SUB and COMP, and provides the additional possibilities of X1 being compounded with its preceding instruction and of X4 being compounded with its following instruction.

On the other hand, a superscalar machine which pairs instructions dynamically in its instruction issue logic on strictly a FIFO basis, would produce only the following pairings as candidates for parallel execution:

[X1 X2][LOAD ADD][SUB COMP][X3 X4]

This inflexible pairing incurs the full penalty of certain interlocking instructions, and only partial benefits of parallel processing are achieved.

Figure 13:
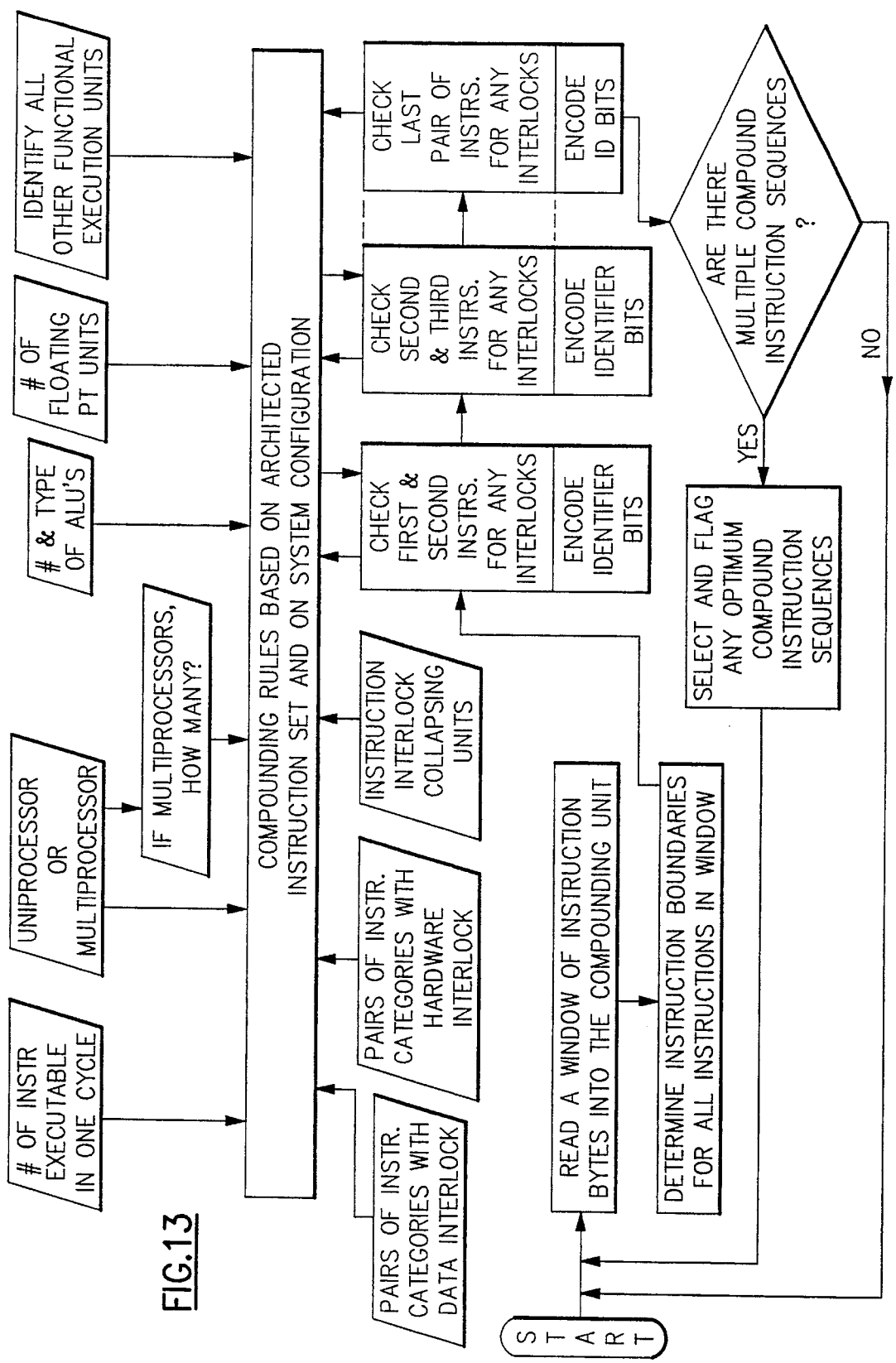
FIG. 13 is a flow chart for developing and using compounding rules applicable to a specific computer system hardware configuration and its particular architected instruction set.

The self explanatory flow chart of FIG. 13 shows the various steps taken to determine which adjacent existing instructions in a byte stream are in categories or classes which qualify them for being grouped together to form a compound instruction for a particular computer system configuration.

Figure 5:
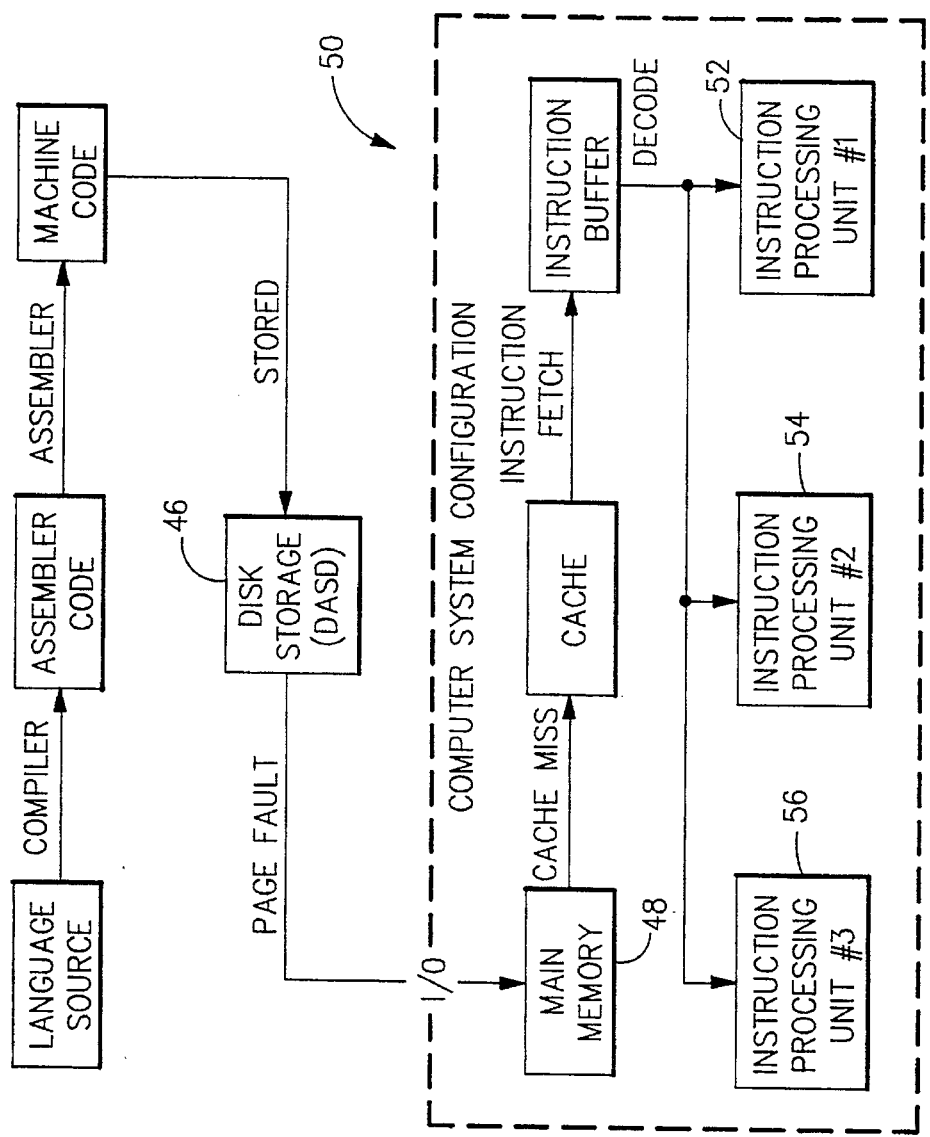
FIG. 5 shows a typical path taken by a program from source code to actual execution.

Referring to FIG. 5, there are many possible locations in a computer system where compounding may occur, both in software and in hardware. Each has unique advantages and disadvantages. As shown in FIG. 5, there are various stages that a program typically takes from source code to actual execution. During the compilation phase, a source program is translated into machine code and stored on a disk 46. During the execution phase the program is read from the disk 46 and loaded into a main memory 48 of a particular computer system configuration 50 where the instructions are executed by appropriate instruction processing units 52, 54, 56. Compounding could take place anywhere along this path. In general as the compounder is located closer to an instruction processing unit or CPUs, the time constraints become more stringent. As the compounder is located further from the CPU, more instructions can be examined in a large sized instruction stream window to determine the best grouping for compounding for increasing execution performance. However such early compounding tends to have more of an impact on the rest of the system design in terms of additional development and cost requirements.

One of the important objects of the invention is to provide a technique for existing programs written in existing high level languages or existing assembly language programs to be processed by software means which can identify sequences of adjacent instructions capable of parallel execution by individual functional units.

Figure 6:
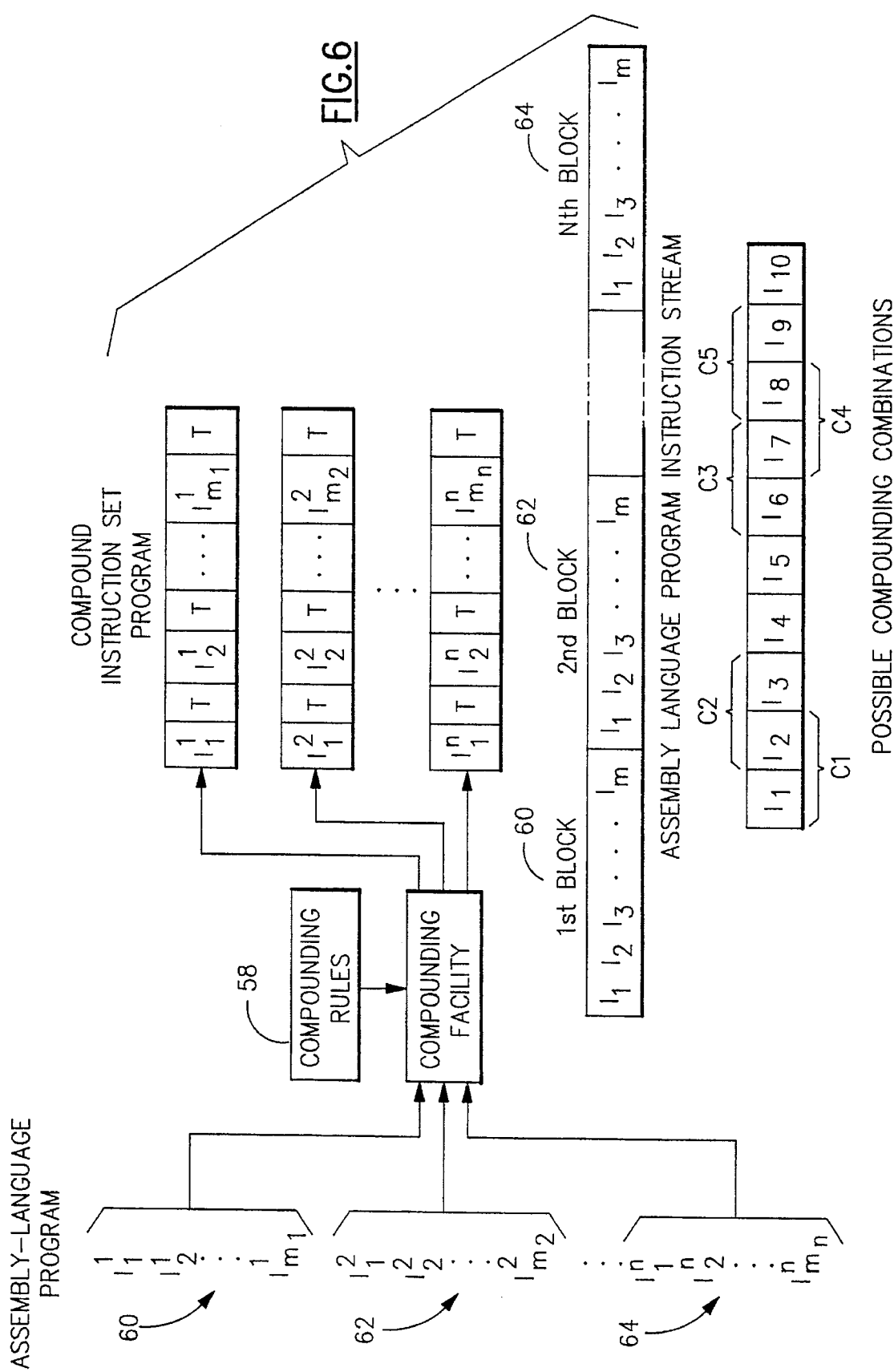
FIG. 6 is a flow diagram showing generation of a compound instruction set program from an assembly language program.

The flow diagram of FIG. 6 shows the generation of a compound instruction set program from an assembly language program in accordance with a set of customized compounding rules 58 which reflect both the system and hardware architecture. The assembly language program is provided as an input to a software compounding facility 59 that produces the compound instruction program. Successive blocks of instructions having a predetermined length are analyzed by the software compounding facility 59. The length of each block 60, 62, 64 in the byte stream which contains the group of instructions considered together for compounding is dependent on the complexity of the compounding facility.

As shown in FIG. 6, this particular compounding facility is designed to consider two-way compounding for "m" number of fixed length instructions in each block. The primary first step is to consider if the first and second instructions constitute a compoundable pair, and then if the second and third constitute a compoundable pair, and then if the third and fourth constitute a compoundable pair, all the way to the end of the block.

Once the various possible compoundable pairs C1–C5 have been identified, an additional very desirable step is to determine the optimum choice of compound instructions formed by adjacent scalar instructions for parallel execution. In the example shown, the following different sequences of compounded instructions are possible (assuming no branching): I1, C2, I4, I5, C3, C5, I10; I1, C2, I4, I5, I6, C4, I9, I10; C1, I3, I4, I5, C3, C5, I10; C1, I3, I4, I5, I6, C4, I9, I10. Based on the particular hardware configuration, the compounding facility can select the preferred sequence of compounded instructions and use flags or identifier bits to identify the optimum sequence of compound instructions.

Figure 14:
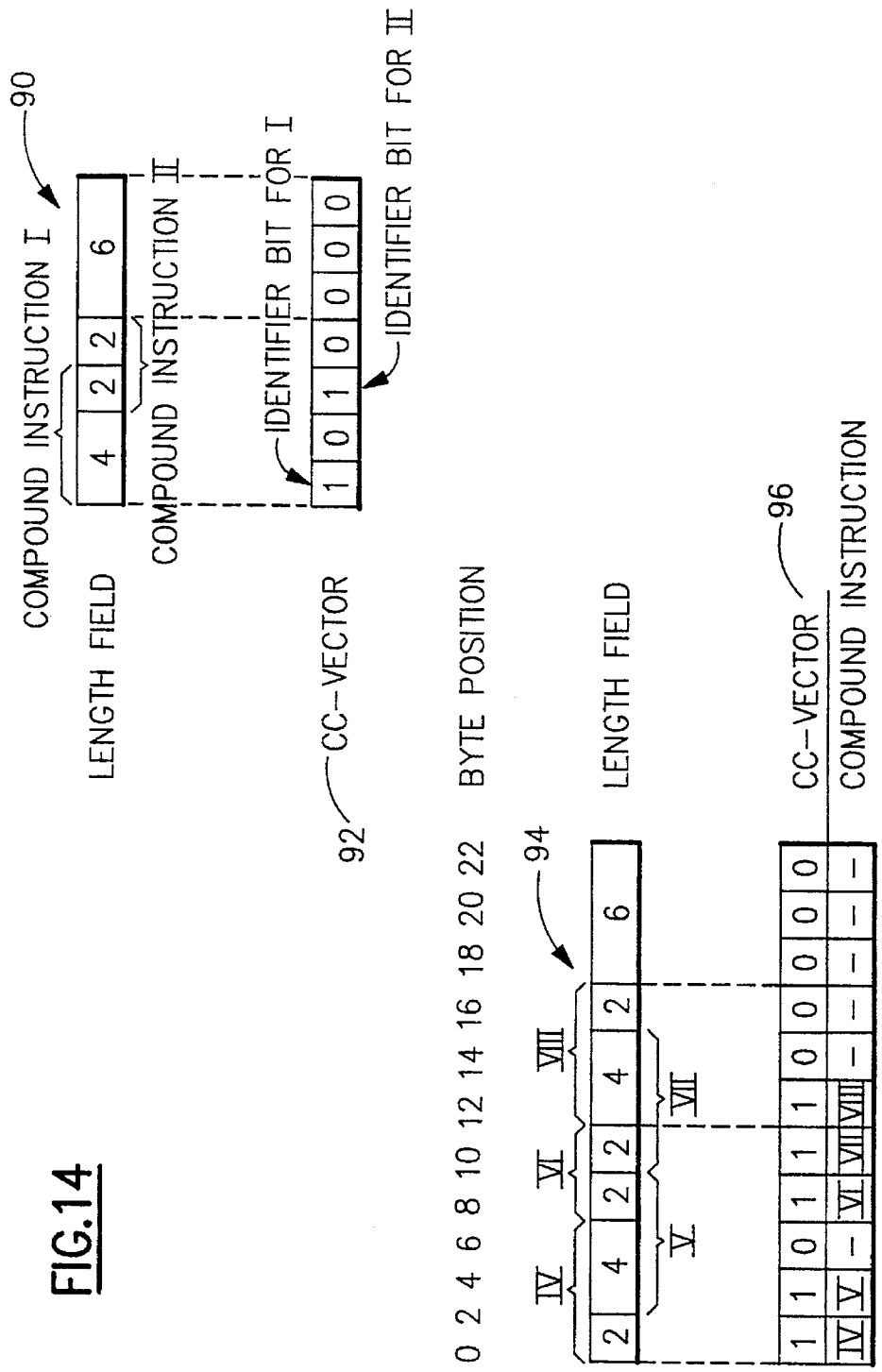
FIG. 14 shows how different groupings of valid non-interlocked pairs of instructions form multiple compound instructions for sequential or branch target execution.

If there is no optimum sequence, all of the compoundable adjacent scalar instructions can be identified so that a branch to a target located amongst various compound instructions can exploit any of the compounded pairs which are encountered (See FIG. 14). Where multiple compounding units are available, multiple successive blocks in the instruction stream could be compounded at the same time.

The specific design of a software compounding facility will not be discussed here because the details are unique to a given instruction set architecture and underlying implementation. Although the design of such compounding programs is somewhat similar in concept to modern compilers which perform instruction scheduling and other optimizations based on a specific machine architecture, the criteria used to complete such compounding are unique to this invention, as best shown in the flow chart of FIG. 13. In both instances, given an input program and a description of the instruction set and also of the hardware architectures (i.e., the structural aspects of the implementation), an output program is produced. In the case of the modern compiler, the output is an optimized new sequence of existing instructions. In the case of the invention, the output is a series of compound instructions each formed by a group of adjacent scalar instructions capable of parallel execution, with the compound instructions being intermixed with non-compounded scalar instructions, and with the necessary control bits for execution of the compound instructions included as part of the output.

Of course, it is easier to pre-process an instruction stream for the purpose of creating compound instructions if known reference points already exist to indicate where instructions begin. As used herein, a reference point means some marking field or other indicator which provides information about the location of instruction boundaries. In many computer systems such a reference point is expressly known only by the compiler at compile time and only by the CPU when instructions are fetched. Such a reference point is unknown between compile time and instruction fetch unless a special reference tagging scheme is adopted.

When compounding is done after compile time, a compiler could indicate with reference tags (see FIG. 11) which bytes contain the first byte of an instruction and which contain data. This extra information results in a more efficient compounder since exact instruction locations are known. Of course, the compiler could identify instructions and differentiate between instructions and data in other ways in order to provide the compounder with specific information indicating instruction boundaries.

Figures 8, 11:
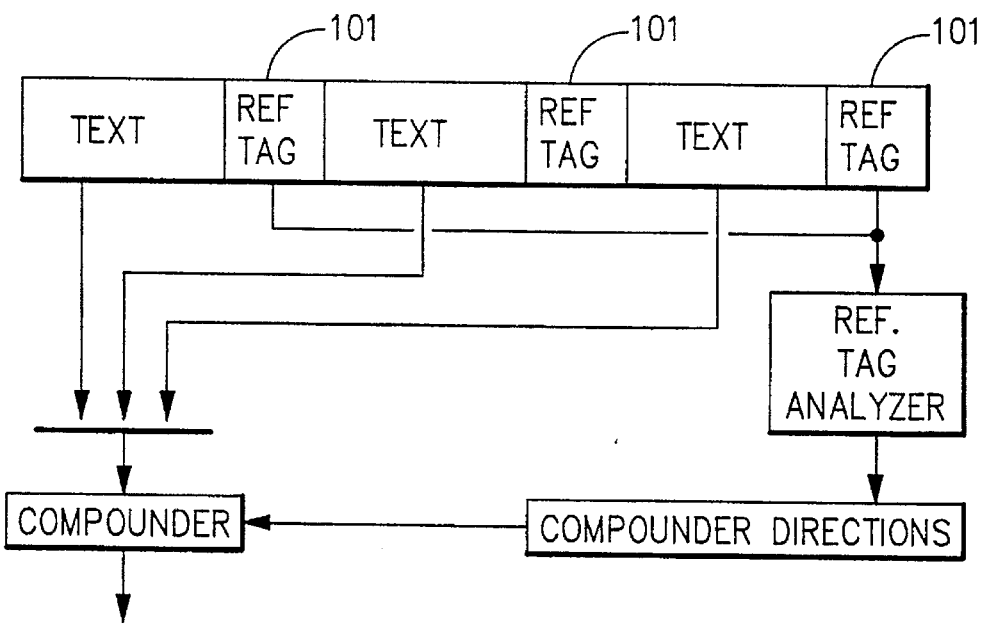
FIG. 8 is an analytical chart for instruction stream texts with identifiable instruction reference points.
FIG. 11 is a flow diagram for compounding an instruction stream having reference tags to identify instruction boundary reference points.

When such instruction boundary information is known, the generation of the appropriate compounding identifier bits proceeds in a straightforward manner based on the compounding rules developed for a particular architecture and system hardware configuration (See FIG. 8). When such instruction boundary information is not known, and the instructions are of variable length, a more complex problem is presented (See FIGS. 9 and 16). Incidentally, these figures are based on a preferred encoding scheme described in more detail in Table 2A below, wherein two-way compounding provides a tag bit of "1" if an instruction is compounded with the next instruction, and a tag bit of "0" if it is not compounded with the next instruction.

The control bits in a control field added by a compounder contain information relevant to the execution of compound instructions and may contain as little or as much information as is deemed effective for a particular implementation. An exemplary 8-bit control field is shown in FIG. 12. However, only the first control bit is required in the simplest embodiment to indicate the beginning of a compound instruction. The other control bits provide additional optional information relating to the execution of the instructions.

In an alternate encoding pattern for compounded instructions applicable to both two-way compounding as well as large group compounding, a first control bit is set to "1" to indicate that the corresponding instruction marks the beginning of a compound instruction. All other members of the compound instruction will have their first control bit set to "0". On occasion, it will not be possible to combine a given instruction with other instructions, so such a given instruction will appear to be a compound instruction of length one. That is, the first control bit will be set to "1", but the first control bit of the following instruction will also be set to "1". Under this alternate encoding scheme, the decoding hardware will be able to detect how many instructions comprise the compound instruction by monitoring all of the identifier bits for a series of scalar instructions, rather than merely monitoring the identifier bit for the beginning of a compound instruction as in the preferred encoding scheme shown below in Tables 2A–2C.

Figure 7:
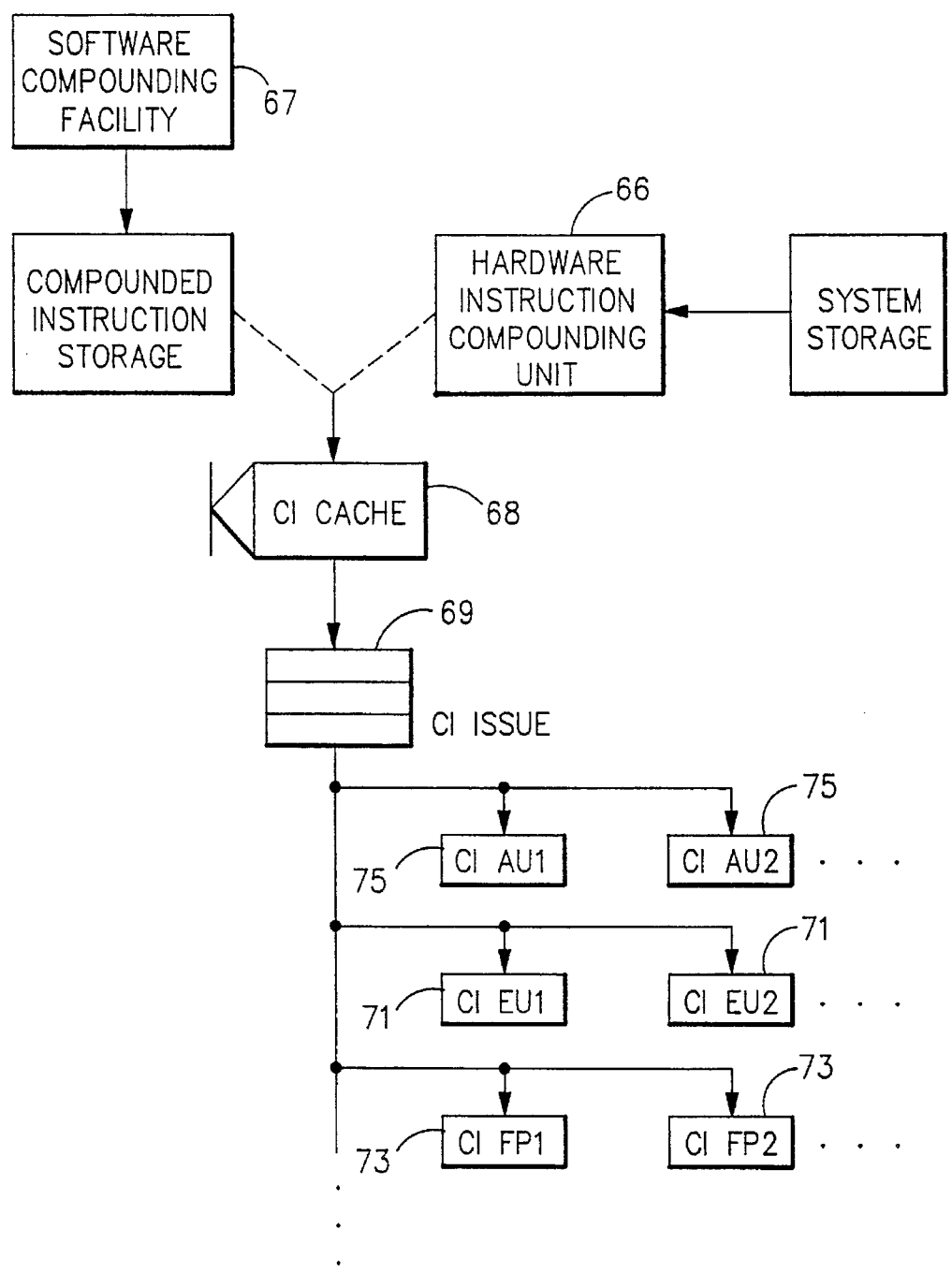
FIG. 7 is a flow diagram showing execution of a compound instruction set program.

The flow diagram of FIG. 7 shows a typical implementation for executing a compound instruction set program which has been generated by a hardware preprocessor 66 or a software preprocessor 67. A byte stream having compound instructions flows into a compound instruction (CI) cache 68 that serves as a storage buffer providing fast access to compound instructions. CI issue logic 69 fetches compound instructions from the CI Cache and issues their individual compounded instructions to the appropriate functions units for parallel execution.

It is to be emphasized that compound instruction execution units (CI EU) 71 such as ALU's in a compound instruction computer system are capable of executing either scalar instructions one at a time by themselves or alternatively compounded scalar instructions in parallel with other compounded scalar instructions. Also, such parallel execution can be done in different types of execution units such as ALU's, floating point (FP) units 73, storage address-generation units (AU) 75 or in a plurality of the same type of units (FP1, FP2, etc) in accordance with the computer architecture and the specific computer system configuration. Thus, the hardware configurations which can implement the present invention are scalable up to virtually unlimited numbers of execution units in order to obtain maximum parallel processing performance. Combining several existing instructions into a single compound instruction allows one or more instruction processing units in a computer system to effectively decode and execute those compounded existing instructions in parallel without the delay that arises in conventional parallel processing computer systems.

In the simplest exemplary encoding schemes of this application, minimal compounding information is added to the instruction stream as one bit for every two bytes of text (instructions and data). In general, a tag containing control information can be added to each instruction in the compounded byte stream—that is, to each non-compounded scalar instruction as well as to each compounded scalar instruction included in a pair, triplet, or larger compounded group. As used herein, identifier bits refers to that part of the tag used specifically to identify and differentiate those compounded scalar instructions forming a compounded group from the remaining non-compounded scalar instructions. Such non-compounded scalar instructions remain in the compound instruction program and when fetched are executed singly.

In a system with all 4-byte instructions aligned on a four byte boundary, one tag is associated with each four bytes of text. Similarly, if instructions can be aligned arbitrarily, a tag is needed for every byte of text.

In the illustrated embodiment herein, all System/370 instructions are aligned on a halfword (two-byte) boundary with lengths of either two or four or six bytes, one tag with identifier bits is needed for every halfword. In a small grouping example for compounding pairs of adjacent instructions, an identifier bit "1" indicates that the instruction that begins in the byte under consideration is compounded with the following instruction, while a "0" indicates that the instruction that begins in the byte under consideration is not compounded. The identifier bit associated with halfwords that do not contain the first byte of an instruction is ignored. The identifier bit for the first byte of the second instruction in a compounded pair is also ignored. (However, in some branching situations, these identifier bits are not ignored.) As a result, this encoding procedure for identifier bits means that in the simplest case of two-way compounding, only one bit of information is needed by a CPU during execution to identify a compounded instruction.

Where more than two scalar instructions can be grouped together to form a compound instruction, additional identifier bits may be required to provide adequate control information. However, in order to reduce the number of bits required for minimal control information, there is still another alternative format for keeping track of the compounding information. For example, even with large group compounding, it is possible to achieve one bit per instruction with the following encoding: the value "1" means to compound with the next instruction, and the value "0" means to not compound with the next instruction. A compound instruction formed with a group of four individual instructions would have a sequence of compounding identifier bits (1,1,1,0). As with the execution of other compound instructions described herein, compounding identifier bits associated with halfwords which are not instructions and therefore do not have any opcodes are ignored at execution time.

Under the preferred encoding scheme described in detail below, the minimum number of identifier bits needed to provide the additional information of indicating the specific number of scalar instructions actually compounded is the logarithm to the base 2 (rounded up to the nearest whole number) of the maximum number of scalar instructions that can be grouped to form a compound instruction. For example, if the maximum is two, then one identifier bit is needed for each compound instruction. If the maximum is three or four, then two identifier bits are needed for each compound instruction. If the maximum is five, six, seven or eight, then three identifier bits are needed for each compound instruction. This encoding scheme is shown below in Tables 2A, 2B and 2C:

TABLE 2A (maximum of two)

| Identifier Bits | Encoded meanings | Total # Compounded |
|---|---|---|
| 0 | This instruction is not compounded with its following instruction | none |

TABLE 2A-continued (maximum of two)

| Identifier Bits | Encoded meanings | Total # Compounded |
|---|---|---|
| 1 | This instruction is compounded with its one following instruction | two |

TABLE 2B (maximum of four)

| Identifier Bits | Encoded meaning | Total # Compounded |
|---|---|---|
| 00 | This instruction is not compounded with its following instruction | none |
| 01 | This instruction is compounded with its one following instruction | two |
| 10 | This instruction is compounded with its two following instructions | three |
| 11 | This instruction is compounded with its three following instructions | four |

TABLE 2C (maximum of eight)

| Identifier Bits | Encoded meaning | Total # Compounded |
|---|---|---|
| 000 | This instruction is not compounded with its following instruction | none |
| 001 | This instruction is compounded with its one following instruction | two |
| 010 | This instruction is compounded with its two following instructions | three |
| 011 | This instruction is compounded with its three following instructions | four |
| 100 | This instruction is compounded with its four following instructions | five |
| 101 | This instruction is compounded with its five following instructions | six |
| 110 | This instruction is compounded with its six following instructions | seven |
| 111 | This instruction is compounded with its seven following instructions | eight |

It will therefore be understood that each halfword needs a tag, but under this preferred encoding scheme the CPU ignores all but the tag for the first instruction in the instruction stream being executed. In other words, a byte is examined to determine if it is a compound instruction by checking its identifier bits. If it is not the beginning of a compound instruction, its identifier bits are zero. If the byte is the beginning of a compound instruction containing two scalar instructions, the identifier bits are "1" for the first instruction and "0" for the second instruction. If the byte is the beginning of a compound instruction containing three scalar instructions, the identifier bits are "2" for the first instruction and "1" for the second instruction and "0" for the third instruction. In other words, the identifier bits for each half word identify whether or not this particular byte is the beginning of a compound instruction while at the same time indicating the number of instructions which make up the compounded group.

These exemplary methods of encoding compound instructions assume that if three instructions are compounded to form a triplet group, the second and third instructions are also compounded to form a pair group. In other words, if a branch to the second instruction in a triplet group occurs, the identifier bit "1" for the second instruction indicates that the second and third instruction will execute as a compounded pair in parallel, even though the first instruction in the triplet group was not executed.

Of course, the invention is not limited to this particular preferred encoding scheme. Various other encoding rules, such as the alternate encoding scheme previously described, are possible within the scope and teachings of the invention.

It will be apparent to those skilled in the art that the present invention requires an instruction stream to be compounded only once for a particular computer system configuration, and thereafter any fetch of compounded instructions will also cause a fetch of the identifier bits associated therewith. This avoids the need for the inefficient last-minute determination and selection of certain scalar instructions for parallel execution that repeatedly occurs every time the same or different instructions are fetched for execution in the so-called super scalar machine.

Despite all of the advantages of compounding a binary instruction stream, it becomes difficult to do so under certain computer architectures unless a technique is developed for determining instruction boundaries in a byte string. Such a determination is complicated when variable length instructions are allowed, and is further complicated when data and instructions can be intermixed, and when modifications are allowed to be made directly to the instruction stream. Of course, at execution time instruction boundaries must be known to allow proper execution. But since compounding is preferably done a sufficient time prior to instruction execution, a unique technique has been developed to compound instructions without knowledge of where instructions start and without knowledge of which bytes are data. This technique is described generally below and can be used for creating compound instructions formed from adjacent pairs of scalar instructions as well as for creating compound instructions formed from larger groups of scalar instructions. This technique is applicable to all instruction sets of the various conventional types of architectures, including the RISC (Reduced Instruction Set Computers) architectures in which instructions are usually a constant length and are not intermixed with data. Additional details of this compounding technique are disclosed in copending application Ser. No. 07/519,382 entitled "General Purpose Compounding Technique For Instruction-Level Parallel Processors" filed May 4th, 1990, now abandoned.

Generally speaking, the compounding technique provides for the compounding two or more scalar instructions from an instruction stream without knowing the starting point or length of each individual instruction. Typical instructions already include an opcode at a predetermined field location which identifies the instruction and its length. Those adjacent instructions which qualify for parallel execution in a particular computer system configuration are provided with appropriate tags to indicate they are candidates for compounding. In IBM System/370 architecture where instructions are either two, four or six bytes in length, the field positions for the opcode are presumed based on an estimated instruction length code. The value of each tag based on a presumed opcode is recorded, and the instruction length code in the presumed opcode is used to locate a complete sequence of possible instructions. Once an actual instruction boundary is found, the corresponding correct tag values are used to identify the commencement of a compound instruction, and other incorrectly generated tags are ignored.

This unique compounding technique is exemplified in the drawings of FIGS. 8–9 and 14–15 wherein the compounding rules are defined to provide that all instructions which are 2 bytes or 4 bytes long are compoundable with each other (i.e., a 2 byte instruction is capable of parallel execution in this particular computer configuration with another 2 byte or another 4 byte instruction). The exemplary compounding rules further provide that all instructions which are 6 bytes long are not compoundable at all (i.e., a 6 byte instruction is only capable of execution singly by itself in this particular computer configuration). Of course, the invention is not limited to these exemplary compounding rules, but is applicable to any set of compounding rules which define the criteria for parallel execution of existing instructions in a specific configuration for a given computer architecture.

The instruction set used in these exemplary compounding techniques of the invention is taken from the System/370 architecture. By examining the opcode for each instruction, the type and length of each instruction can be determined and the control tag containing identifier bits is then generated for that specific instruction, as described in more detail hereinafter. Of course, the present invention is not limited to any specific architecture or instruction set, and the aforementioned compounding rules are by way of example only.

The preferred encoding scheme for compound instructions in these illustrated embodiments has already been shown above in Table 2A–2C.

In a First case with fixed length instructions having no data intermixed and with a known reference point location for the opcode, the compounding can proceed in accordance with the applicable rules for that particular computer configuration. Since the field reserved for the opcode also contains the instruction length, a sequence of scalar instructions is readily determined, and each instruction in the sequence can be considered as possible candidates for parallel execution with a following instruction. A first encoded value in the control tag indicates the instruction is not compoundable with the next instruction, while a second encoded value in the control tag indicates the instruction is compoundable for parallel execution with the next instruction.

In a Second case with variable length instructions having no data intermixed, and with a known reference point location for the opcode and also for the instruction length code (which in System/370 is included as part of the opcode), the compounding can proceed in a routine manner. As shown in FIG. 8, the opcodes indicate an instruction sequence 70 as follows: the first instruction is 6 bytes long, the second and third are each 2 bytes long, the fourth is 4 bytes long, the fifth is 2 bytes long, the sixth is 6 bytes long, and the seventh and eighth are each 2 bytes long.

A C-vector 72 in FIG. 8 shows the values for the identifier bits (called compounding bits in the drawings) for this particular sequence 70 of instructions where a reference point indicating the beginning of the first instruction is known. Based on the values of such identifier bits, the second and third instructions form a compounded pair as indicated by the "1" in the identifier bit for the second instruction. The fourth and fifth instructions form another compounded pair as indicated by the "1" in the identifier bit for the fourth instruction. The seventh and eighth instructions also form a compounded pair as indicated by the "1" in the identifier bit for the seventh instruction.

The C-vector 72 of FIG. 8 is relatively easy to generate when there are no data bytes intermixed with the instruction bytes, and where the instructions are all of the same length with known boundaries.

Another situation is presented in a Third case where instructions are mixed with non-instructions, with a reference point still being provided to indicate the beginning of an instruction. The schematic diagram of FIG. 11 shows one way of indicating an instruction reference point, where every halfword has been flagged with a reference tag to indicate whether or not it contains the first byte of an instruction. This could occur with both fixed length and variable length instructions. By providing the reference point, it is unnecessary to evaluate the data portion of the byte stream for possible compounding. Accordingly, the compounding unit can skip over and ignore all of the non-instruction bytes.

Figure 9:
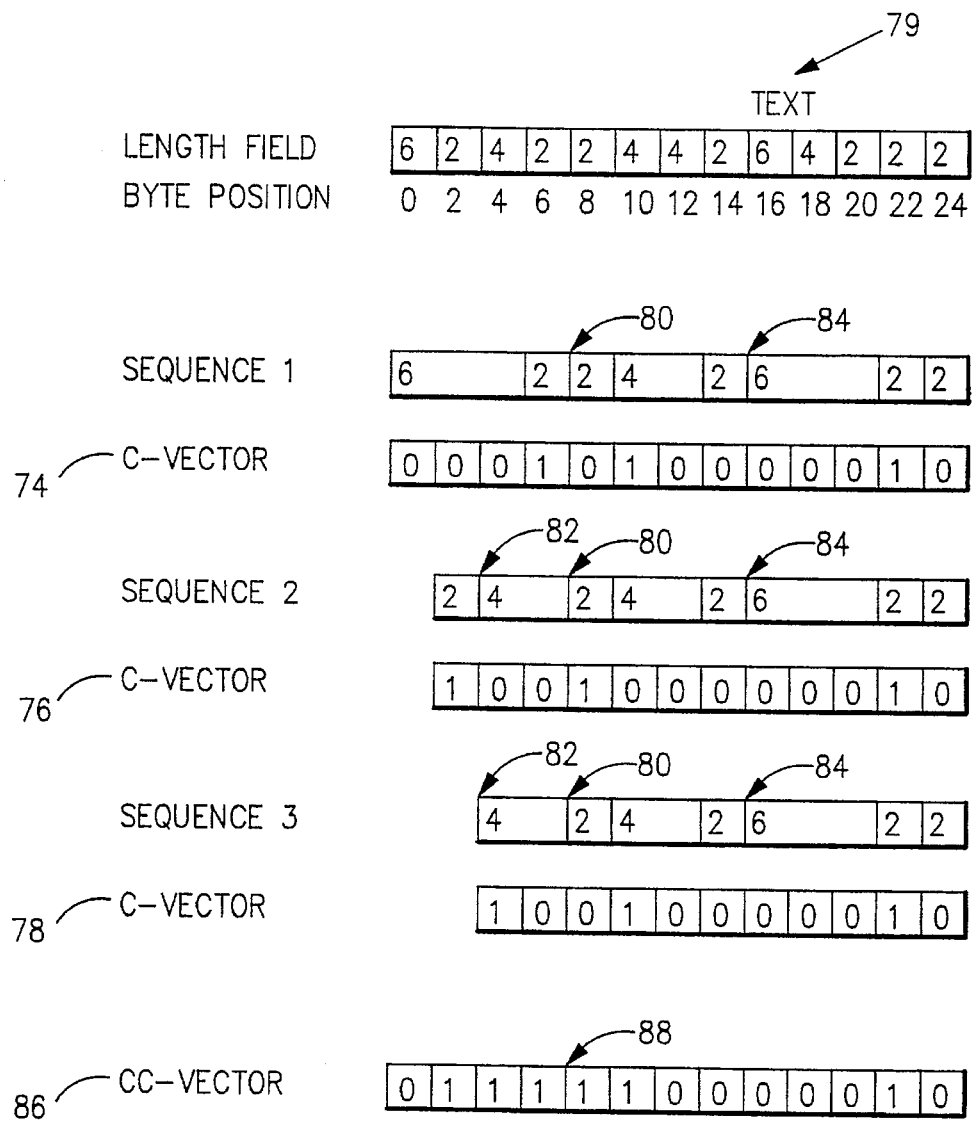
FIG. 9 is an analytical chart for an instruction stream text with variable length instructions without a reference point, showing their related sets of possible compound identifier bits.

A more complicated situation arises where a byte stream includes variable length instructions (without data), but it is not known where a first instruction begins. Since the maximum length instruction is six bytes, and since instructions are aligned on two byte boundaries, there are three possible starting points for the first instruction the the stream. Accordingly, the technique provides for considering all possible starting points for the first instruction in the text of a byte stream 79, as shown in FIG. 9.

Sequence 1 assumes that the first instruction starts with the first byte, and proceeds with compounding on that premise. In this exemplary embodiment, the length field is also determinative of the C-vector value for each possible instruction. Therefore a C-vector 74 for Sequence 1 only has a "1" value for the first instruction of a possible compounded pair formed by combinations of 2 byte and 4 byte instructions.

Sequence 2 assumes that the first instruction starts at the third byte (the beginning of the second halfword), and proceeds on that premise. The value in the length field for the third byte is 2 indicating the next instruction begins with the fifth byte. By proceeding through each possible instruction based on the length field value in the preceding instruction, the entire potential instructions of Sequence 2 are generated along with the possible identifier bits as shown in a C-vector 76.

Sequence 3 assumes that the first instruction starts at the fifth byte (the beginning of the third halfword), and proceeds on that premise. The value in the length field for the fifth byte is 4 indicating the next instruction begins with the ninth byte. By proceeding through each possible instruction based on the length field value in the preceding instruction, the entire potential instructions of Sequence 3 are generated along with the possible identifier bits as shown in a C-vector 78.

In some instances the three different Sequences of potential instructions will converge into one unique sequence. In FIG. 9 it is noted that the three Sequences converge on instruction boundaries at the end 80 of the eighth byte. Sequences 2 and 3, while converging on instruction boundaries at the end 82 of the fourth byte, are out-of-phase in compounding until the end of the sixteenth byte. In other words, the two sequences consider different pairs of instructions based on the same sequence of instructions. Since the seventeenth byte begins a non-compoundable instruction at 84, the out-of-phase convergence is ended.

When no valid convergence occurs, it is necessary to continue all three possible instruction sequences to the end of the window. However, where valid convergence occurs and is detected, the number of sequences collapses from three to two (one of the identical sequences becomes inoperative), and in some instances from two to one.

Thus, prior to convergence, tentative instruction boundaries are determined for each possible instruction sequence and identifier bits assigned for each such instruction indicating the location of the potential compound instructions. It is apparent from FIG. 9 that this technique generates three separate identifier bits for every two text bytes. In order to provide consistency with the pre-processing done in the aforementioned first, second and third cases, it is desirable to reduce the three possible sequences to a single sequence of identifier bits where only one bit is associated with each halfword. Since the only information needed is whether the current instruction is compounded with the following instruction, the three bits can be logically ORed to produce a single sequence in a CC-vector 86.

For purposes of parallel execution, the composite identifier bits of a composite CC-vector are equivalent to the separate C-vectors of the individual three Sequences 1–3. In other words, the composite identifier bits in the CC-vector allow any of the three possible sequences to execute properly in parallel for compound instructions or singly for non-compounded instructions. The composite identifier bits also work properly for branching. For example, if a branch to the beginning 88 of the ninth byte occurs, then the ninth byte must begin an instruction. Otherwise there is an error in the program. The identifier bit "1" associated with the ninth byte is used and correct parallel execution of such instruction with its next instruction proceeds.

Figure 16B:
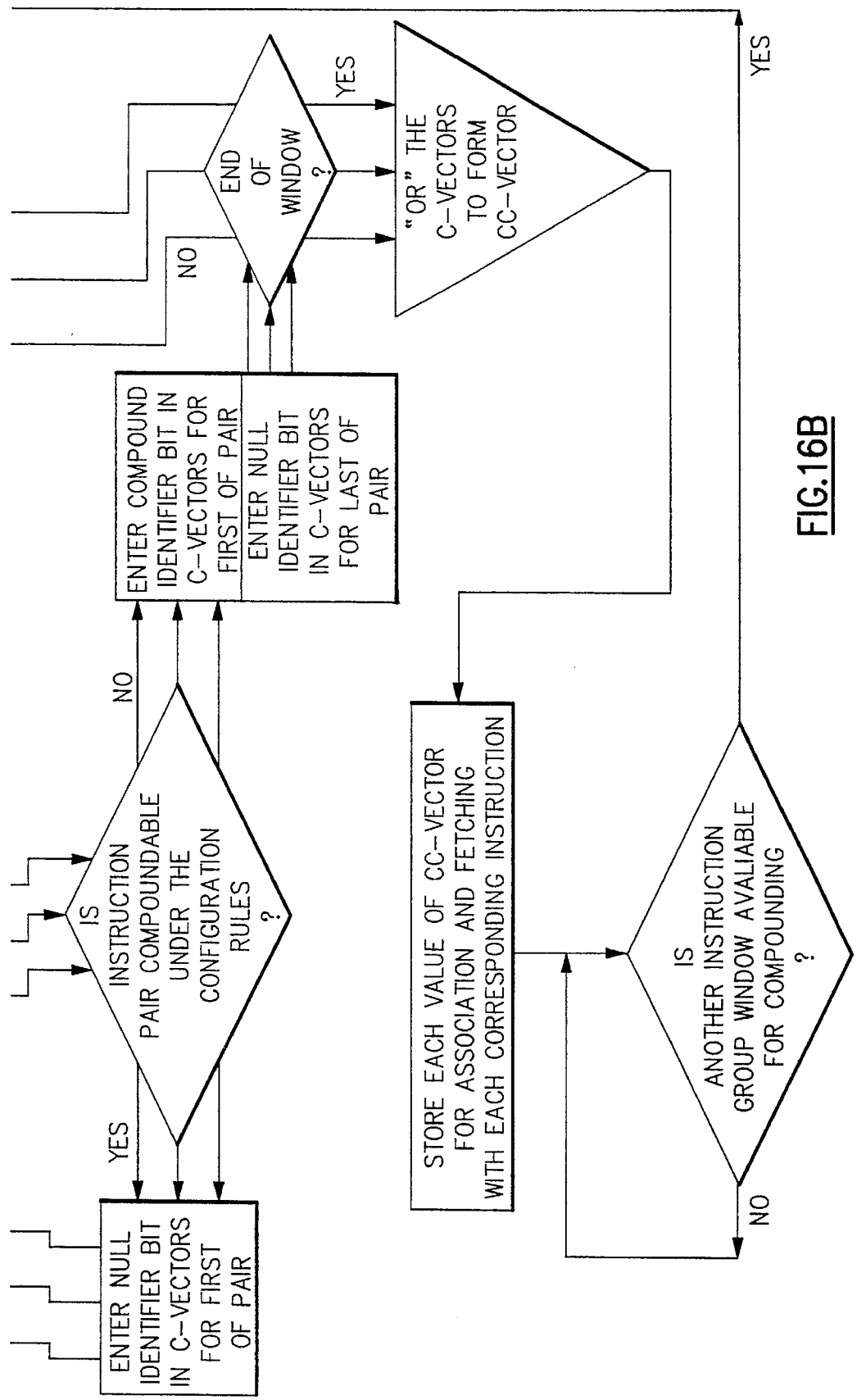
FIG. 16 comprises FIGS. 16A and 16B which together is a flow chart for compounding an instruction stream like the one shown in FIG. 9 which includes variable length instructions without boundary reference points.

The various steps in the compounding method shown in FIG. 9 as described above are illustrated in the self-explanatory flow chart of FIG. 16.

The best time for providing reference point information for instruction boundaries is at the time of compiling. Reference tags 101 could be added at compile time to identify the beginning of each instruction, as shown in FIG. 11. This enables the compounder to proceed with the simplified technique for the aforementioned First, Second and Third cases. Of course, the compiler could identify instruction boundaries and differentiate between instructions and data in other ways, in order to simplify the work of the compounding unit and avoid the complications of a technique like the one shown in FIG. 9.

Figure 10:
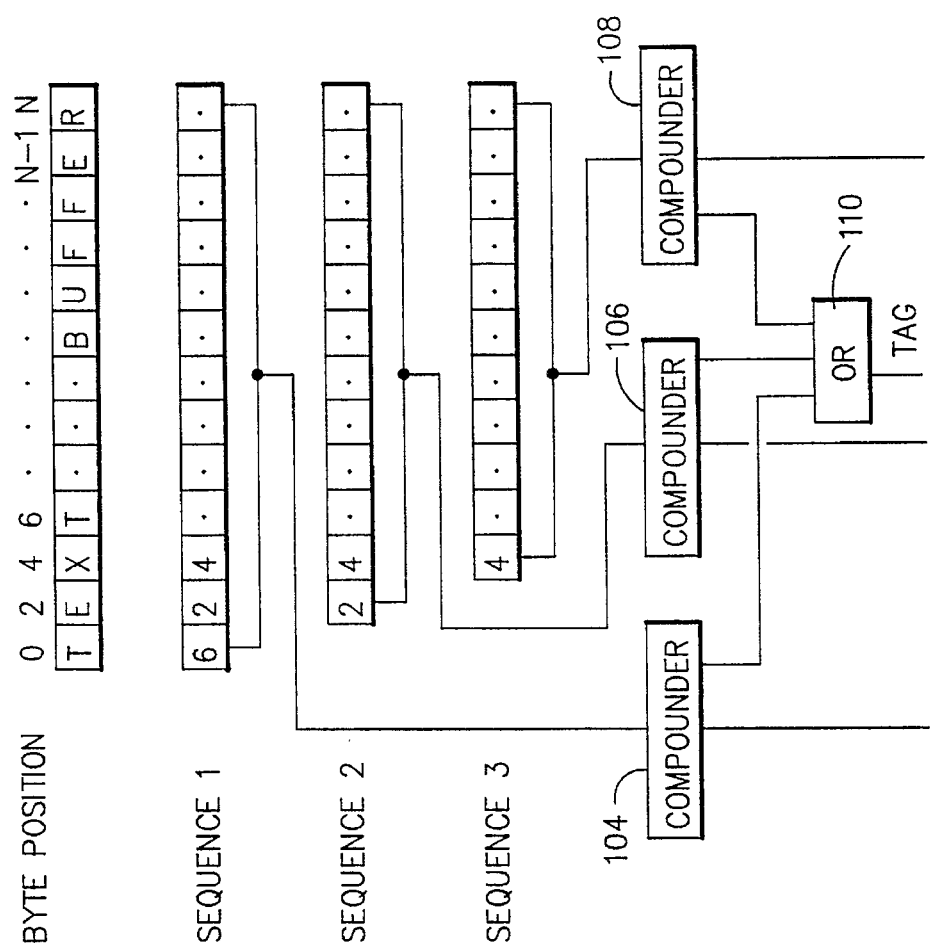
FIG. 10 illustrates a logical implementation of an instruction compound facility for handling the instruction stream text of FIG. 9.

FIG. 10 shows a flow diagram of a possible implementation of a compounder for handling instruction streams like the one in FIG. 9. A multiple number of compounder units 104, 106, 108 are shown, and for efficiency purposes this number could be as large as the number of halfwords that could be held in a text buffer. In this version, the three compounder units would begin their processing sequences at the first, third, and fifth bytes, respectively. Upon finishing with a possible instruction sequence, each compounder starts examining the next possible sequence offset by six bytes from its previous sequence. Each compounder produces compound identifier bits (C-vector values) for each halfword in the text. The three sequences from the three compounders are ORed 110 and the resulting composite identifier bits (CC-vector values) are stored in association with their corresponding textual bytes.

Figure 15:
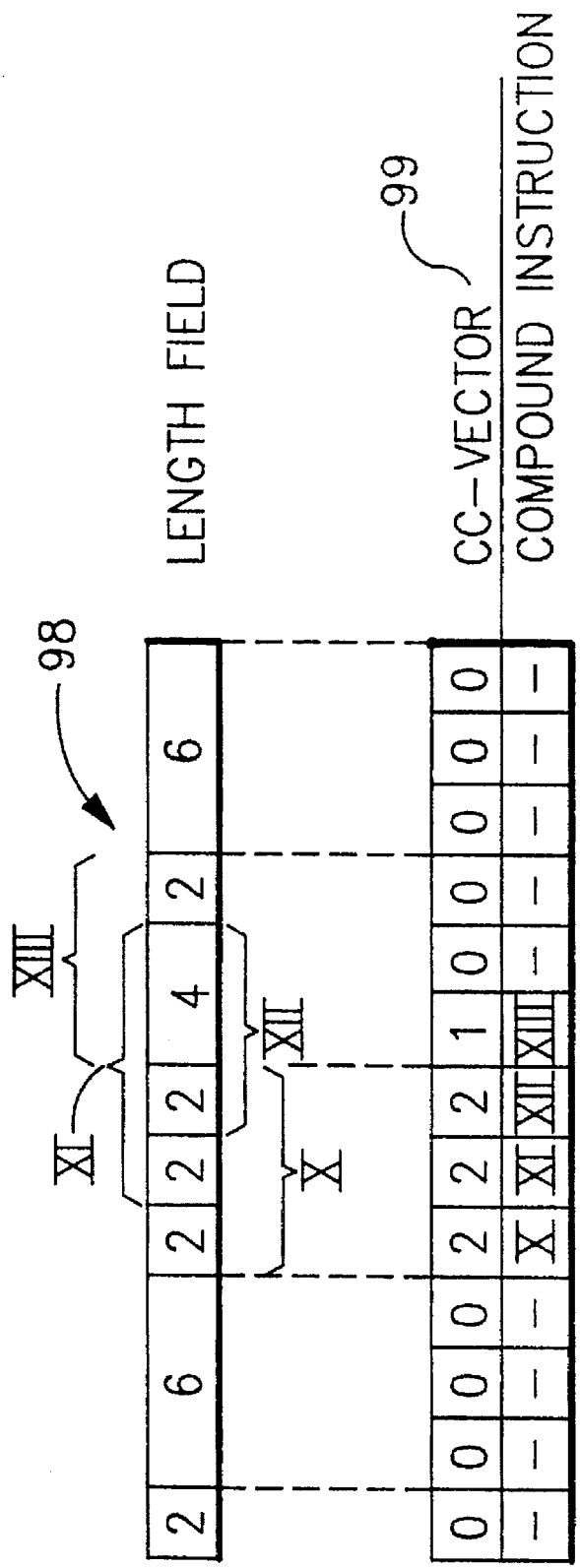
FIG. 15 shows how different groupings of valid non-interlocked triplets of instructions form multiple compound instructions for sequential or branch target execution.

One beneficial advantage provided by the composite identifier bits in the CC-vector is the creation of multiple valid compounding bit sequences based on which instruction is addressed by a branch target. As best shown in FIGS. 14–15, differently formed compounded instructions are possible from the same byte stream.

FIG. 14 shows the possible combinations of compounded instructions when the computer configuration provides for parallel issuance and execution of no more than two instructions. Where an instruction stream 90 containing compounded instructions is processed in normal sequence, the Compound Instruction I will be issued for parallel execution based on decoding of the identifier bit for the first byte in a CC-vector 92. However, if a branch to the fifth byte occurs, the Compound Instruction II will be issued for parallel execution based on decoding of the identifier bit for the fifth byte.

Similarly, a normal sequential processing of another compounded byte stream 94 will result in Compound Instructions IV, VI and VIII being sequentially executed (the component instructions in each compound instruction being executed in parallel). In contrast, branching to the third byte in the compounded byte stream will result in Compound Instructions V and VII being sequentially executed, and the instruction beginning at the fifteenth byte (it forms the second part of Compound Instruction VIII) will be issued and executed singly, all based in the identifier bits in the CC-vector 96.

Branching to the seventh byte will result in Compound Instructions VI and VIII being sequentially executed, and branching to the eleventh byte will result in Compound Instruction VIII being executed. In contrast, branching to the ninth byte in the compounded byte stream will result in Compound Instruction VII being executed (it is formed by the second part of Compound Instruction VI and the first part of Compound Instruction VIII).

Thus, the identifier bits "1" in the CC-vector 96 for Compound Instructions IV, VI and VIII are ignored when either of the Compound Instructions V or VII is being executed. Alternatively the identifier bits "1" in the CC-vector 96 for Compound Instructions V and VII are ignored when any of Compound Instructions IV, VI or VIII are executed. FIG. 15 shows the possible combinations of compounded instructions when the computer configuration provides for parallel issuance and execution of up to three instructions. Where an instruction stream 98 containing compounded instructions is processed in normal sequence, the Compound Instructions X (a triplet group) and XIII (a pair group) will be executed. In contrast, branching to the eleventh byte will result in Compound Instruction XI (a triplet group) being executed, and branching to the thirteenth byte will result in Compound Instruction XII (a different triplet group) being executed.

Thus, the identifier bits "2" in a CC-vector 99 for Compound Instructions XI and XII are ignored when Compound Instructions X and XIII are executed. On the other hand when Compound Instruction XI is executed, the identifier bits for the other three Compound Instructions X, XII, XII are ignored. Similarly when Compound Instruction XII is executed, the identifier bits for the other three Compound Instructions X, XI, XIII are ignored.

There are many possible designs for an instruction compounding unit depending on its location and the knowledge of the text contents. In the simplest situation, it would be desirable for a compiler to indicate with reference tags which bytes contain the first byte of an instruction and which contain data. This extra information results in a more efficient compounder since exact instruction locations are known. This means that compounding could always be handled as in the First, Second and Third case situations in order to generate the C-vector identifier bits for each compound instruction. A compiler could also add other information such as static branch prediction or even insert directives to the compounder.

Other ways could be used to differentiate data from instructions where the instruction stream to be compounded is stored in memory. For example, if the data portions are infrequent, a simple list of addresses containing data would require less space than reference tags. Such combinations of a compounder in hardware and software provide many options for efficiently producing compound instructions.

While exemplary preferred embodiments of the invention have been disclosed, it will be appreciated by those skilled in the art that various modifications and changes can be made without departing from the spirit and scope of the invention as defined by the following claims.

We claim:

1. A computer implemented method for processing a sequence of binary encoded scalar instructions, each instruction including an operation code, prior to fetching for execution in a data processing system, which places constraints on parallel instruction execution, including the steps of:

transferring said sequence of binary encoded scalar instructions from a data storage unit to an instruction compounding unit;

assigning each operation code in said sequence of instructions to one of a plurality categories based on a function performed by said data processing system in response to said operation code, the number of said categories being less than the number of operation codes in said sequence of instructions;

storing in said data processing system matrix data that encodes which instruction pairs in said sequence of instructions are compoundable based on the category assigned to the operation code of each adjacent instruction of said instruction pairs;

processing groups of instructions in said compounding unit to generate a compounding instruction for instruction pairs by comparing to said matrix data the category assigned in said assigning step respectively to each instruction of the instruction pairs in said group of instructions.

2. The method of claim 1 wherein said processing step is performed prior to the time the existing instructions are fetched for execution.

3. The method of claim 1 wherein said processing step retains the object code of the existing instructions in its original form for execution singly or for execution in parallel with another instruction when a fetched instruction has a compounding indicator that its associated instruction can be executed in parallel with an adjacent intruction of a fetched instruction stream.

4. The method of claim 1 wherein said processing step takes into account data dependent interlocks between instructions as well as the existence of related interlock collapsing functional units in the particular configuration of the data processing system.

5. The method of claim 1 wherein said processing step takes into account hardware dependent interlocks between instructions as well as the existence of related interlock collapsing functional units in the particular configuration of a data processing system.

6. The method of claim 1 wherein said processing step compares a first existing instruction with a second adjacent following instruction for possible compounding with each other, and then compares the second instruction with a third adjacent following intruction for possible compounding with each other, to identify multiple compound instructions identified by multiple compounding indicators, respectively.

7. The method of claim 6 further including the additional step of determining an optimum sequence of multiple compound instructions for a given portion of an instruction stream.

8. The computer implemented method as in claim 1 wherein said compounding instruction is associated with each instruction of the instruction stream which can be grouped as adjacent instructions which can be executed in parallel in a particular configuration of a data processing system has a value n which indicates the number of instructions following the instruction in the instruction stream which can be compounded with the instruction upon execution of the instruction when the original instruction is fetched with the associated compounding indicator for execution in a particular computer configuration.

* * * * *